(12) United States Patent
Nakamura

(10) Patent No.: US 7,580,398 B2
(45) Date of Patent: Aug. 25, 2009

(54) INFORMATION PROCESSING DEVICE, PRINTING DEVICE, PRINTING SYSTEM, SYSTEM SETTING METHOD, STORAGE MEDIUM STORING COMPUTER-READABLE PROGRAM, AND PROGRAM

(75) Inventor: Atsushi Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 11/158,189

(22) Filed: Jun. 21, 2005

(65) Prior Publication Data

US 2006/0002352 A1 Jan. 5, 2006

(30) Foreign Application Priority Data

Jun. 30, 2004 (JP) ............... 2004-193950

(51) Int. Cl.
*H04W 4/00* (2006.01)
(52) U.S. Cl. ..................................... 370/338
(58) Field of Classification Search ............... 370/310, 370/328, 338; 709/220; 713/1, 2; 710/8, 710/10
See application file for complete search history.

(56) References Cited

U.S. PATENT DOCUMENTS

| | | | |
|---|---|---|---|
| 6,384,926 B2 * | 5/2002 | Mochizuki ............ | 358/1.15 |
| 7,099,797 B1 * | 8/2006 | Richard ................. | 702/182 |
| 7,199,895 B2 * | 4/2007 | Collier et al. .......... | 358/1.15 |
| 2002/0051184 A1 * | 5/2002 | Fritz et al. ............. | 358/1.15 |
| 2002/0147819 A1 | 10/2002 | Miyakoshi et al. | |
| 2003/0019596 A1 | 1/2003 | Fujii | |
| 2003/0156567 A1 * | 8/2003 | Oak ...................... | 370/338 |
| 2004/0082309 A1 * | 4/2004 | Smith ................... | 455/344 |
| 2005/0125664 A1 * | 6/2005 | Berkema et al. ....... | 713/168 |
| 2005/0223230 A1 * | 10/2005 | Zick ...................... | 713/171 |
| 2006/0105714 A1 * | 5/2006 | Hall et al. .............. | 455/41.3 |

FOREIGN PATENT DOCUMENTS

JP 07-200209 8/1995

(Continued)

OTHER PUBLICATIONS

Belkin F1UP0001 User Manual. Copyright 2003.*

(Continued)

*Primary Examiner*—Lester Kincaid
*Assistant Examiner*—Nathan Mitchell
(74) *Attorney, Agent, or Firm*—Canon USA Inc IP Div

(57) ABSTRACT

A setting method for use with an information processing device capable of communicating with a printing device and having both a wireless interface for communicating with the printing device via a wireless LAN access point and a predetermined wired interface for communicating with the printing device. The method includes an acquiring step of acquiring, via the wired interface, first access point information concerning a wireless LAN access point to which the printing device is connectable, and an issuing step of, if a wireless LAN access point corresponding to the first access point information acquired by the acquiring step coincides with a wireless LAN access point corresponding to second access point information, issuing a network setting instruction to the printing device via the wired interface so as to enable the information processing device and the printing device to communicate with each other via the coincident wireless LAN access point.

5 Claims, 18 Drawing Sheets

FOREIGN PATENT DOCUMENTS

| | | | |
|---|---|---|---|
| JP | 2002345027 A | * | 11/2002 |
| JP | 2002-359623 | | 12/2002 |
| JP | 2003218730 A | * | 7/2003 |
| JP | 2003-258809 | | 9/2003 |
| JP | 2003-304262 | | 10/2003 |

OTHER PUBLICATIONS

"Sharing Is aprt of the job of wireless printing". New York Times. Feb. 3, 2004.*

* cited by examiner

ENTER PORT NAME

WLAN01 — 8-16

8-15

8-17  8-18  8-19

| RETURN | NEXT | CANCEL |

⇩

NETWORK INSTALLATION
COMPLETED         8-21

● CREATE ONLY WIRELESS
   LAN ICON
○ CREATE BOTH WIRELESS
   LAN ICON AND USB ICON 8-22       8-23

OK 8-20

| SSID | SIGNAL INTENSITY | SECURITY (WEP) |
|---|---|---|
| A | 80% | ON |
| B | 75% | OFF |
| C | 90% | OFF |

FIG.16

USB COMMAND

ACCESS POINT SEARCH COMMAND CMD1
    INFORMATION ACQUISITION COMMAND CMD2
    INFORMATION SETUP COMMAND CMD3

FIG.17

NETWORK COMMAND

PRINTER SEARCH COMMAND (BROADCAST) CMD11
    PRINTER SEARCH COMMAND (ADDRESSING) CMD12

FIG.18

NETWORK DRIVER INTERFACE COMMAND

WIRELESS INTERFACE QUERY COMMAND CMD21
    (CONNECTION) SSID ACQUISITION COMMAND CMD22

INFORMATION PROCESSING DEVICE, PRINTING DEVICE, PRINTING SYSTEM, SYSTEM SETTING METHOD, STORAGE MEDIUM STORING COMPUTER-READABLE PROGRAM, AND PROGRAM

BACKGROUND OF THE INVENTION

1. Field of the Invention

The present invention relates to an information processing device, a printing device, a printing system, a system setting method, a storage medium storing a computer-readable program, and a program. The information processing device and the printing device have plural interfaces including a wired interface and a wireless interface and are capable of communicating with each other via a predetermined access point.

2. Description of the Related Art

Conventionally, a method is widely known in which a printer can be commonly shared by plural host PC's in a network. In recent years, a printer and a printer adapter having a wireless interface have been widely used, by which a network of a wireless system can be constructed instead of using a conventional wiring system.

Further, as prices of wireless devices lower, a wireless interface LAN is coming into wide use at home.

As one example, there is the 802.11b standard determined by IEEE and wireless devices conforming to this standard such as a wireless LAN access point, a router and the like are in the market. Further, wireless devices which are built in a PC (personal computer) or can be attached thereto in PCMCIA card format to the system are being sold widely. With regard to a printer, one to one connection with a PC via a local interface such as a USB or the like is typical, but there is now an increasing demand for a network which can satisfy the needs to print from plural PC's at home.

In a typical household, arrangement of wiring is difficult or requires a certain level of knowledge. Therefore, there is a strong demand for printers that enable connections with a simple and easy wireless LAN.

However, setting wireless LAN to realize a desired wireless LAN connection has been conventionally complicated, which requires expertise concerning a wireless LAN and network, and therefore causing difficulty to the user.

In order to set a wireless LAN of a device by a wireless LAN interface, it is necessary to change the wireless LAN communication setting of a PC such as wireless operation modes and connection ID (SSID) in accordance with the device. Therefore, the setting cannot be carried out unless the wireless LAN setting of the PC at home that has been enabling wireless communication and functioning normally is eliminated, which has been very troublesome.

Further, in connecting a device to an access point, there has been inconvenience such that a user must remember his SSID of the access point and input to the device.

In order to solve the above problems, several setting methods have been considered in which setting of a wireless LAN is carried out using interfaces other than a wireless LAN interface and which are easy to perform a preparing operation. For example, a method to set a wireless LAN by interconnecting a printer and an access point by a wired LAN interface is now appearing.

However, in this case, by interconnecting a printer and an access point with wiring, the physical configuration of the access point which is already in use at home is changed only for the purpose of setting up printer and it is difficult to return the connection condition to the original state after setup is complete. Further, since the physical configuration of the access point is changed to a temporary state for setup, therefore, it is difficult to confirm whether they are correctly connected to each other in the actual usage configuration, which is also a problem.

SUMMARY OF THE INVENTION

The present invention is directed to an information processing device, a system setting method, a storage medium storing a computer-readable program, and a program. The information processing device is capable of communicating with the printing device and has both a wireless interface for communicating with the printing device via a wireless LAN access point and a predetermined wired interface for communicating with the printing device. In one aspect of the present invention, an information processing device includes an acquiring unit configured to acquire, via the wired interface, first access point information concerning a first wireless LAN access point to which the printing device is connectable. The information processing device also includes an issuing unit configured to, if the first wireless LAN access point corresponding to the first access point information acquired by the acquiring unit coincides with a second wireless LAN access point corresponding to second access point information, issue a network setting instruction to the printing device via the wired interface so as to enable the information processing device and the printing device to communicate with each other via the coincident second wireless LAN access point. Accordingly, a network connection setting is automatically completed between the printing device and the access point while reflecting the wireless LAN network setting between the information processing device and the access point.

In another aspect of the present invention, a printing device capable of communicating with an information processing device having both a wireless interface for communicating with the printing device via a wireless LAN access point and a predetermined wired interface for communicating with the printing device includes: (1) a responding unit configured to, responsive to an access point information acquisition request from the information processing device via the predetermined wired interface, detect information concerning the wireless LAN access point accessible via the wireless interface and to transmit the information to the information processing device, and (2) a network setting unit configured to, responsive to a network setting instruction from the information processing device via the predetermined wired interface, execute network setting with the wireless LAN access point.

According to the present invention, it is possible to securely complete network setting of a printing device functioning as a wireless LAN printer applicable for existing network environments, without carrying out complicated network environment settings.

Other features of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is another example of a first network installation screen to be displayed on the CRT shown in FIG. 2.

FIG. 16 is an example of a command to be transmitted among the PC, the printer and the access point shown in FIG. 1.

FIG. 17 is another example of a command to be transmitted among the PC, the printer and the access point shown in FIG. 1.

FIG. 18 is another example of a command to be transmitted among the PC, the printer and the access point shown in FIG. 1.

DETAILED DESCRIPTION OF THE EMBODIMENTS

Embodiments of the invention will be described in detail below with reference to the drawings.

First Embodiment

Figure 1:
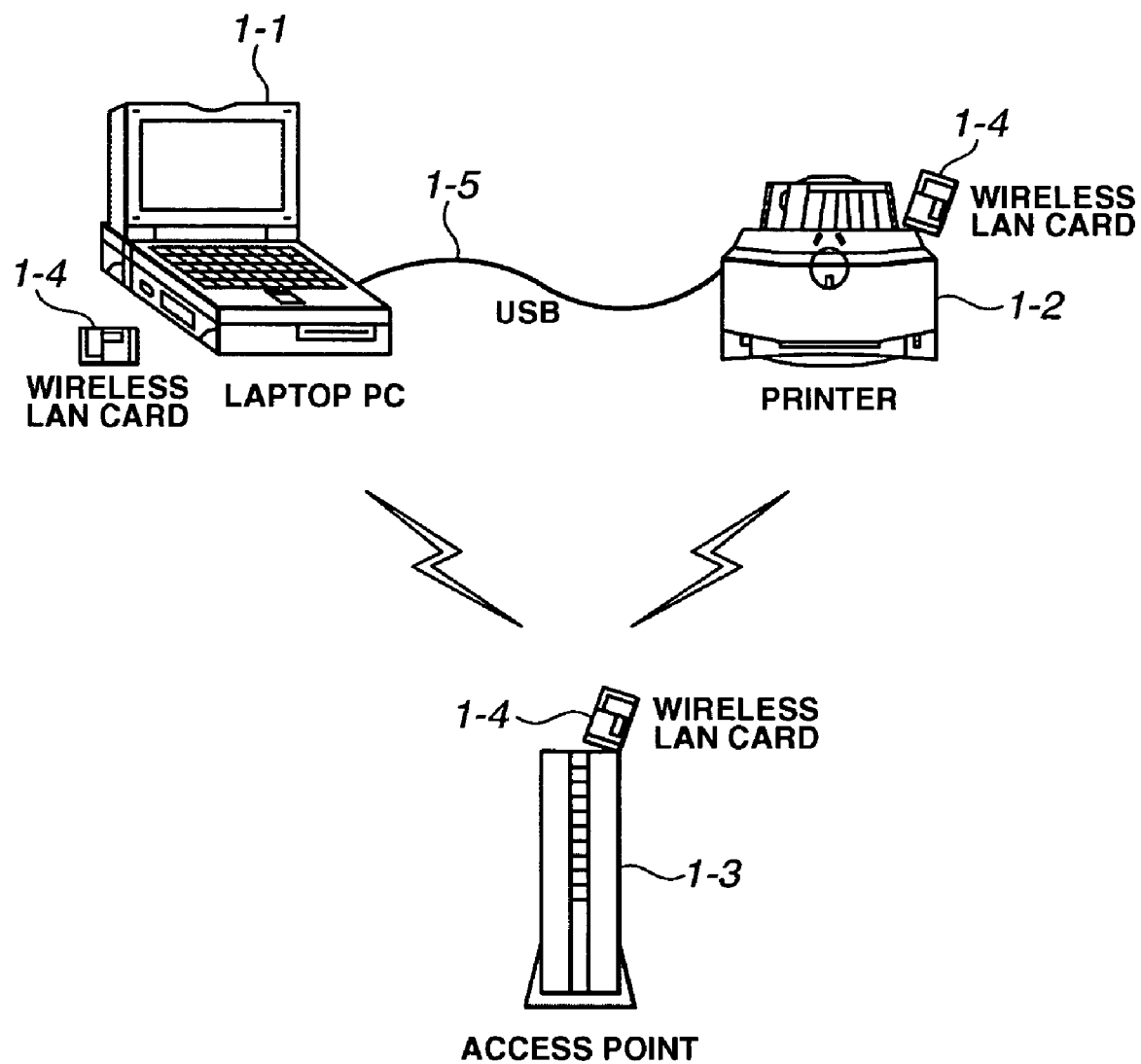
FIG. 1 is a schematic view showing an example of a data processing system including an information processing device and a printer according to a first embodiment of the present invention.

FIG. 1 is a schematic view showing an example of a data processing system including an information processing device and a printer according to a first embodiment of the present invention, in which on the one hand the information processing device is connected via a bi-directional interface and on the other hand communication with a printer to which a wireless LAN card can be attached is possible using a specified protocol via an access point (mediator).

In FIG. 1, a laptop PC (PC) 1-1 has a USB interface as a wired local interface and can be provided with a wireless LAN card 1-4 of a PCMCIA card type as a wireless interface. Further, a printer 1-2 has both a wired local interface and a wireless interface similarly to the PC 1-1.

Figure 2:
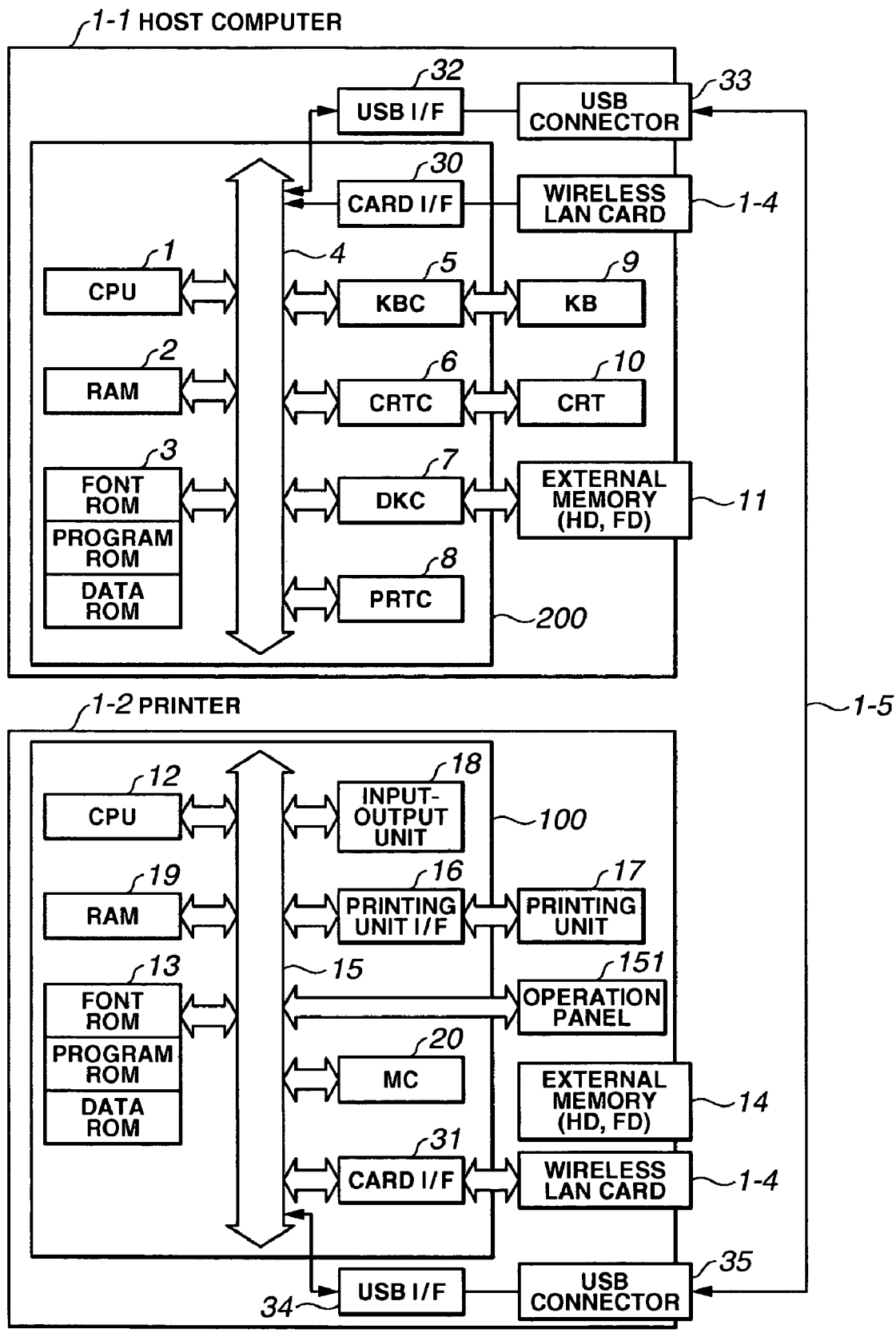
FIG. 2 is a block diagram showing a hardware structure of a host computer and a printer shown in FIG. 1.

Referring also to FIG. 2, the USB interface (denoted as reference numeral 32) can be connected to the printer 1-2 to enable wired communication via a USB interface cable 1-5 which is connected to a USB connector 33. Further, as a wireless interface, the wireless LAN card 1-4 of a PCMCIA card type is attached to PC 1-1 via a card I/F 30. An access point 1-3 of the wireless interface plays a role as a mediator between wireless devices. To the access point 1-3, a wireless LAN card 1-4 of a PCMCIA card type can be attached.

Between the PC 1-1 and the printer 1-2, printing can be carried out using the USB interface cable 1-5 and printing data can be sent via the access point 1-3 to the printer 1-2 using the wireless LAN interface.

FIG. 2 is a block diagram illustrating the hardware structure of the host computer 1-1 and the printer 1-2 shown in FIG. 1 and an identical reference numeral is allotted to the same component as in FIG. 1.

The present system is configured to be connected to the host computer 1-1 and the printer 1-2 to enable communication between them. The method for communicating and connecting according to the present invention is not limited to the interface or network as above discussed.

In FIG. 2, the host computer 1-1 is provided with a CPU 1. The CPU 1 processes a document containing graphics, images, characters, tables (including table calculations) and so forth in a mixed state on the basis of a document processing program stored in a program ROM of ROM 3 or an external memory 11. The CPU 1 centrally controls respective devices connected to a system bus 4.

An operating system program (hereinafter OS) and the like are stored in the program ROM of the ROM 3 or the external memory 11 as a control program of the CPU 1. Further, font data used in the document processing are stored in a font ROM of the ROM 3 or the external memory 11 and various kinds of other data used in the document processing are stored in a data ROM of the ROM 3 or the external memory 11.

A RAM 2 functions as a main memory and a work area of the CPU 1. A keyboard controller (KBC) 5 controls key input from a keyboard (KB) 9 and a pointing device (not shown). A CRT controller (CRTC) 6 controls a CRT display (CRT) 10. A disk controller (DKC) 7 controls accesses to the external memory 11 that stores a boot program, various kinds of applications, font data, user files, edit files and program for creating printer control command (hereinafter, printer driver) and so forth. The external memory 11 can be a hard disk (HD), a flexible disk (FD) or the like.

A printer controller (PRTC) 8 is connected to the printer 1-2 via the USB interface cable 1-5 serving as a predetermined bi-directional interface and controls communication with the printer 1-2. The card interface 30 is configured to enable access to the wireless LAN card 1-4 that is attached to a slot. Reference numeral 32 denotes a USB interface and the USB interface cable 1-5 is connected to the USB connector 33. The CPU 1 executes, for example, a process to rasterize display information stored on the RAM 2 into outline fonts and enables WYSIWYG on the CRT 10. Further, the CPU 1 opens various stored windows and executes various kinds of data processing on the basis of commands instructed by a mouse cursor and the like displayed on the CRT 10.

In executing printing, a user opens a window concerning printing setting and carry out setting of the printer 1-2 and setting of printing methods to the printer driver including selection of printing modes.

On the other hand, the printer 1-2 has a printer CPU 12. The printer CPU 12, on the basis of the control program stored in the program ROM of the ROM 13 or the control program stored in the external memory 14, outputs image signals as output information to a printing unit (printer engine) 17 connected to a system bus 15. Further, in the program ROM of this ROM 13, a control program of the CPU 12 is stored. In the font ROM of the ROM 13, font data to be used in creating the output information are stored and information to be used on the host computer 1-1 is stored in the data ROM of the ROM 13 when the printer 1-2 does not use the external memory 14 such as a hard disk.

The CPU 12 can communicate with the host computer 1-1 via an input-output unit 18 and send information within the printer 1-2 to the host computer 1-1. A RAM 19 functions as a main memory and a work area of the CPU 12 and its memory capacity can be expanded by an optional RAM that can be connected to an additional port (not shown).

Reference numeral 31 denotes a card interface and is accessible to the wireless LAN card 1-4 that is attached to a slot. Reference numeral 34 denotes a USB interface, and the USB interface cable 1-5 is connected to a USB connector 35. The RAM 19 is used as an output information development area, an environment data storage area, an NVRAM and so forth. Accesses to the above-mentioned hard disk (HD) and the external memory 14 such as an IC card are controlled by a memory controller (MC) 20. The external memory 14 can be connected as an option, and store font data, emulation programs, form data and so forth. Reference numeral 151 denotes the operation panel, switches, LED displays and the like for operation are arranged thereon.

Further, one or more units of the above-mentioned external memory 14 are provided, and plural external memories containing an optional font card in addition to incorporated fonts and a program that interprets printer control languages of different language systems may be connected thereto. Further, a nonvolatile NVRAM (not shown) may be provided to store printer mode setting information from an operation panel 151.

In the printing system structured as above, the information processing device has the following features.

The information processing device has, for example, the card interface 30 and the wireless LAN card 1-4, as a wireless interface for communicating with the printer 1-2 via the access point 1-3 shown in FIG. 1 which functions as a wireless access point. The information processing device also has the USB interface cable 1-5 as a predetermined wired interface for communicating with the printing device 1-2. When the CPU 1 executes the network setting control program, first access point information concerning the wireless LAN access point to which the printing device is connected via the USB interface 32 shown in FIG. 2 is acquired. If the wireless LAN access point corresponding to the acquired first access point information coincides with the wireless LAN access point corresponding to second access point information concerning the wireless LAN access point that the information processing device has, a network setting instruction is issued to the printing device 1-2 via the USB interface cable 1-5 so as to enable the information processing device and the printing device to communicate with each other via the coincident wireless LAN access point.

Accordingly, in the condition where the wireless LAN settings of the access point 1-3 and the PC 1-1 are maintained, access point information of the printer 1-2 and the access point 1-3 is acquired via the USB interface cable 1-5 and the printer 1-2 is instructed to set wireless LAN connection environment which reflects the setting of the access point 1-3 and the PC 1-1. Accordingly, the wireless LAN connection environment of the printer 1-2 can be set automatically.

The PC 1-1, after installation of a driver to the printer 1-2 is performed, acquires first access point information of a wireless LAN access point to which the printer 1-2 can be connected via the USB interface cable 1-5.

Since the connection environment with the wireless LAN access point can be subsequently set up automatically after completing installation of the driver to the printing device, even a user inexperienced in network setting can carry out a network connection without trouble.

On the other hand, the printer 1-2 has the following features.

The printer has a card interface 31 and the wireless LAN card 1-4, serving as a wireless interface for communicating with the information processing device via the access point 1-3 shown in FIG. 1 serving as a wireless LAN access point. The printer also has a USB interface 34 shown in FIG. 2 as a predetermined wired interface for communicating with the information processing device. When the CPU 12 shown in FIG. 2 executes the communication setting control program stored in the ROM 13 and the like, on the basis of an access point information acquisition request from the PC 1-1 via the USB interface 32, the printer detects information concerning access points from the access point 1-3, via the wireless LAN card 1-4, and responds to the PC 1-1. Then, on the basis of network setting instruction from the PC 1-1 via the USB interface 32, the printer executes network setting with respect to the access point 1-3.

Accordingly, in the condition where the wireless LAN setting of the access point 1-3 and the PC 1-1 are maintained, according to the access point information acquisition request from the PC 1-1 via the USB interface cable 1-5, the printer acquires the access point information between the printer 1-2 and the access point 1-3, and the printer 1-2 is instructed to set wireless LAN connection environment which reflects the setting of the access point 1-3 and the PC 1-1. Accordingly, the wireless LAN connection environment of the printer 1-2 can be set up automatically.

Figure 11:
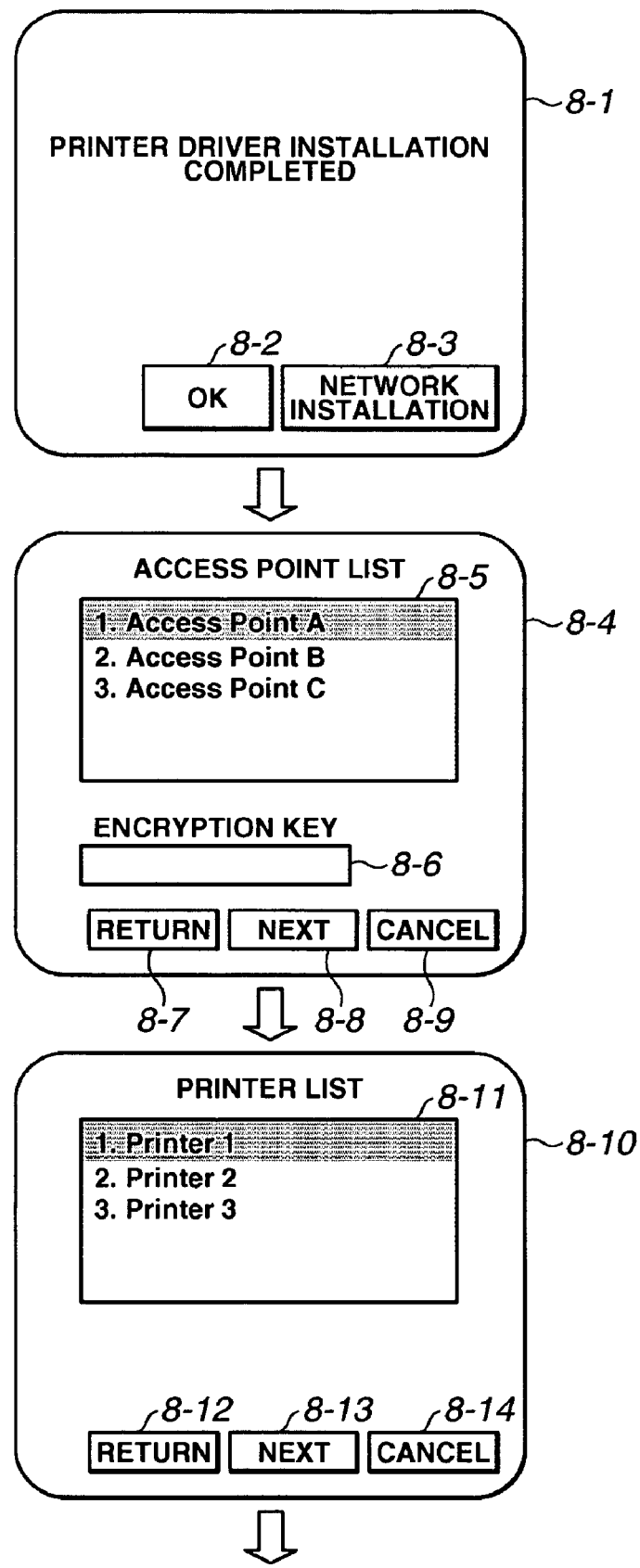
FIG. 11 is an example of a first network installation to be displayed on the CRT shown in FIG. 2.

When there is not any coincident access point, the PC 1-1 displays an access point list based on the first access point information acquired from the printer 1-2, for example, an access point list 8-4 on CRT 10 as shown in FIG. 11 according to the CPU 1. When a desired access point is selected from the displayed access point list, the PC 1-1 issues to the printer 1-2 a request to establish connection to the selected access point via the USB interface 34.

Thus, when plural access points connectable to the printer 1-2 and the PC 1-1 are retrieved, the user can select any access point as the connection destination.

Figure 3:
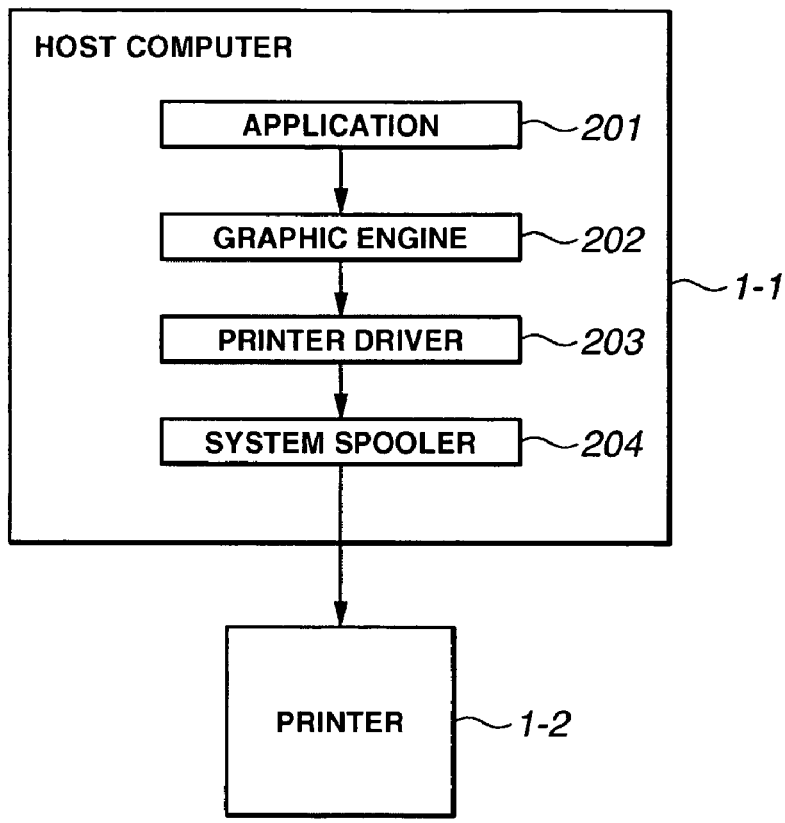
FIG. 3 is a diagram illustrating a module structure for a typical printing process in the host computer shown in FIG. 2.

FIG. 3 is a view illustrating a module structure for typical printing processing in the host computer 1-1 shown in FIG. 2. A printing device such as the printer 1-2 is connected directly to the host computer 1-1 or connected via a network.

In FIG. 3, an application 201, a graphic engine 202, a printer driver 203, and a system spooler 204 are files to be stored in the external memory 11. They are program modules that are loaded into the RAM 2 and executed by the operating system (OS) and other modules.

The application 201 and the printer driver 203 can be added to the external memory 11 (HD) via an FD, a CD-ROM, or a network (not shown).

The application 201 stored in the external memory 11 is loaded into the RAM 2 and executed. When printing is performed in the printer 1-2 by this application 201, outputting (drawing) is carried out using the graphic engine 202 that is also loaded into the RAM 2 and is executed.

The graphic engine 202 loads similarly the printer driver 203 prepared for each printer from the external memory 11 into the RAM 2 and converts the output of the application 201 into the control command of the printer 1-2 using the printer driver 203. The converted printer control command is output through the system spooler 204 loaded into the RAM 2 by the OS to the printer 1-2 via the USB interface cable 1-5.

Figure 4:
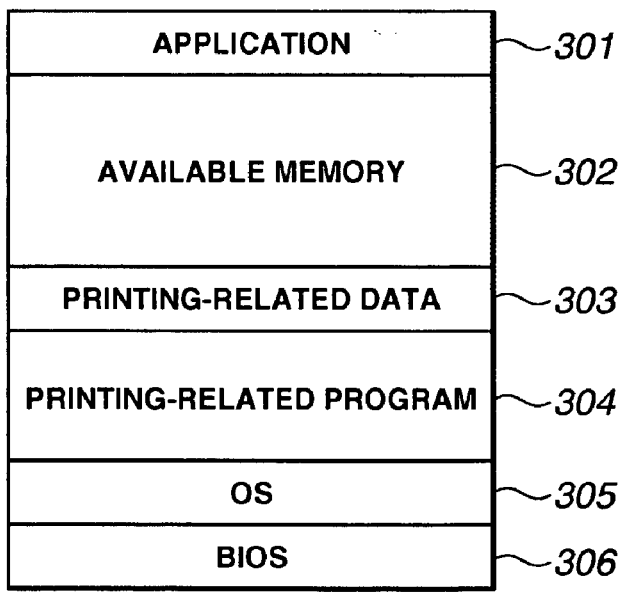
FIG. 4 is a diagram illustrating a memory map of a RAM shown in FIG. 2.

FIG. 4 is a view illustrating the memory map of the RAM 2 shown in FIG. 2 and corresponds to the condition where printing-related modules including the printing program in the present embodiment is loaded into the RAM 2 on the host computer 1-1 and is in an executable state.

In FIG. 4, reference numeral 301 denotes an application for printing, reference numeral 302 denotes an available memory, reference numeral 303 denotes printing-related data, reference numeral 304 denotes a printing-related program, reference numeral 305 denotes an OS and reference numeral 306 denotes a BIOS. The printing control program in the present embodiment exists as part of the printing-related program 304.

While only one PC is shown in the system example in FIG. 1, plural PC's may be connected to one access point so that one printer can be shared by plural PC's to perform printing, respectively.

Further, a wireless LAN has an infrastructure mode which enables connection to plural wireless LAN devices via an access point. In the infrastructure mode, the same ID as set to an access point (SSID) is set also to wireless LAN devices, thereby a LAN can include plural wireless LAN devices via an access point. In this case, if a printer is used as a wireless LAN, it is necessary to set the printer connectable to an access point.

It is assumed in the present embodiment that the setting between the PC 1-1 and the access point 1-3 has already been made and communication can be made between the PC 1-1 and the access point 1-3 in the infrastructure mode.

Further, it is assumed that the setting of the wireless LAN has not been made concerning the printer 1-2 and the ID has not been set in the infrastructure mode as initial condition. In printers provided with no wireless LAN, connecting to a PC via a USB generally carries out printing.

The printer 1-2 has also the USB interface 34 as shown in FIG. 2, through which printing can be carried out like a usual printer. In general, a certain type of OS is operating in a PC and in order to carry out printing under the OS environment, printing software (printer driver 203 shown in FIG. 3) is required.

The printer driver 203 is supplied from an OS vendor or a printer manufacturer and is installed into a PC in advance, or supplied via a medium such as a CD-ROM. In order to carry out printing by the printer 1-2, the printer driver 203 must be installed therein in some form.

When printing is carried out using a wireless LAN, it is necessary to set the wireless LAN in the printer 1-2 to make it connectable with an access point and install software into the PC 1-1 that enables printing by wireless LAN and set the PC 1-1 suitable to the printer 1-2.

Various methods are used to perform installation with respect to wireless LAN devices.

For example, in a method for setting a wireless LAN by a wireless LAN interface, it is necessary to change the wireless LAN communication setting of the PC 1-1 such as wireless operation modes and connection ID (SSID) according to the device, therefore the setting cannot be carried out unless wireless LAN setting of the PC that has enabled wireless communication so far has to be changed once, which causes the problem as discussed above.

Further, in connecting a device to the access point 1-3, there has been inconvenience that a user must remember the SSID of the access point 1-3 which the user has to input to the device.

As such, several setting methods are considered in which setting of a wireless LAN is carried out using interfaces other than a wireless LAN interface and which enable to perform a preparing operation easily. For example, a method to set a wireless LAN by interconnecting the printer 1-2 and an access point by a wired LAN interface is now appearing.

However, as discussed above, the problem of the conventional technique is that by interconnecting the printer 1-2 and the access point 1-3 with wiring, the connection condition and setting of the access point 1-3 that is already in use at home can be changed only for the purpose of setting, and in such a case, it is difficult or troublesome to return the connection condition and setting to the original one.

Further, in this case, the PC 1-1 and the printer 1-2 that have to be set actually are still connected via wireless LAN, and therefore, it is difficult to confirm that they are correctly connected to each other.

Compared with the above technique, the installation of a wireless LAN is carried out using respective USB interfaces that the PC 1-1 and the printer 1-2 have in the present embodiment.

In the printer 1-2 having the wireless LAN interface 31 and the USB interface 34, as in the case of the installation of the printer 1-2 that is locally connected to the PC 1-1 via a general USB interface, the PC 1-1 and the printer 1-2 are interconnected with the USB interface cable 1-5. After the printer driver 203 is installed, a wireless LAN can be installed without changing the conditions of communication connection on the interface.

Since the setting of the wireless LAN of the printer 1-2 is carried out through communication via the USB interface between the PC 1-1 and the printer 1-2, it is possible to set the wireless LAN of the printer 1-2 without changing the wireless LAN setting and physical wire connection of the PC 1-1 and the access point 1-3 as to which normal communication settings have already been established.

The installation of a general printer driver is described in the following <Installation Processing of Printer Driver>. After that, the installation of a printer driver using a USB interface and the installation of a wireless LAN using a USB interface in the present embodiment are described.

<Printer Driver Installation Processing>

In order to connect a printer, such as the printer 1-2, to a host computer, such as the PC 1-1, and carry out printing, software is required that recognizes printing commands from a printing application on the OS of the host computer 1-1, transfer printing control commands based on printing commands, and printing data to the printer 1-2 and controls the printer 1-2. The printer driver 203 as discussed above is the software that controls the printer in this way.

As shown in the printer driver 203 in FIG. 3, all the hardware items connected to the host computer 1-1 receive control commands from the application 201 via a device driver. The device driver is not exclusively dedicated to a specific high level application that is operated on an operating system (OS). Accordingly, while a device is connected to a host computer, it occupies a specific memory area (for example, the RAM 2) and remains there as a kind of resident program.

Recent OS's represented by, for example, windows (registered trademark) have Plug and Play (PnP) functions, which installs automatically a device driver appropriate for the device when a device is connected to the host computer 1-1.

In the case of Plug and Play processing to connect the device to the host computer for the first time, if the most suitable one is not found among device drivers that the OS has as standard components, it is necessary to install a device driver into the OS which is supplied in form of a flexible disk or a CD-ROM at the time of purchasing the device.

The installation of a device driver is called installation work of a driver.

Installation processing of a device driver in an OS having the Plug and Play function, especially installation of a printer driver, is described below.

As the representative of wired interfaces for Plug and Play (PnP), there is a USB interface. The installation of a printer driver using a USB interface is described herein as an example.

Figure 5:
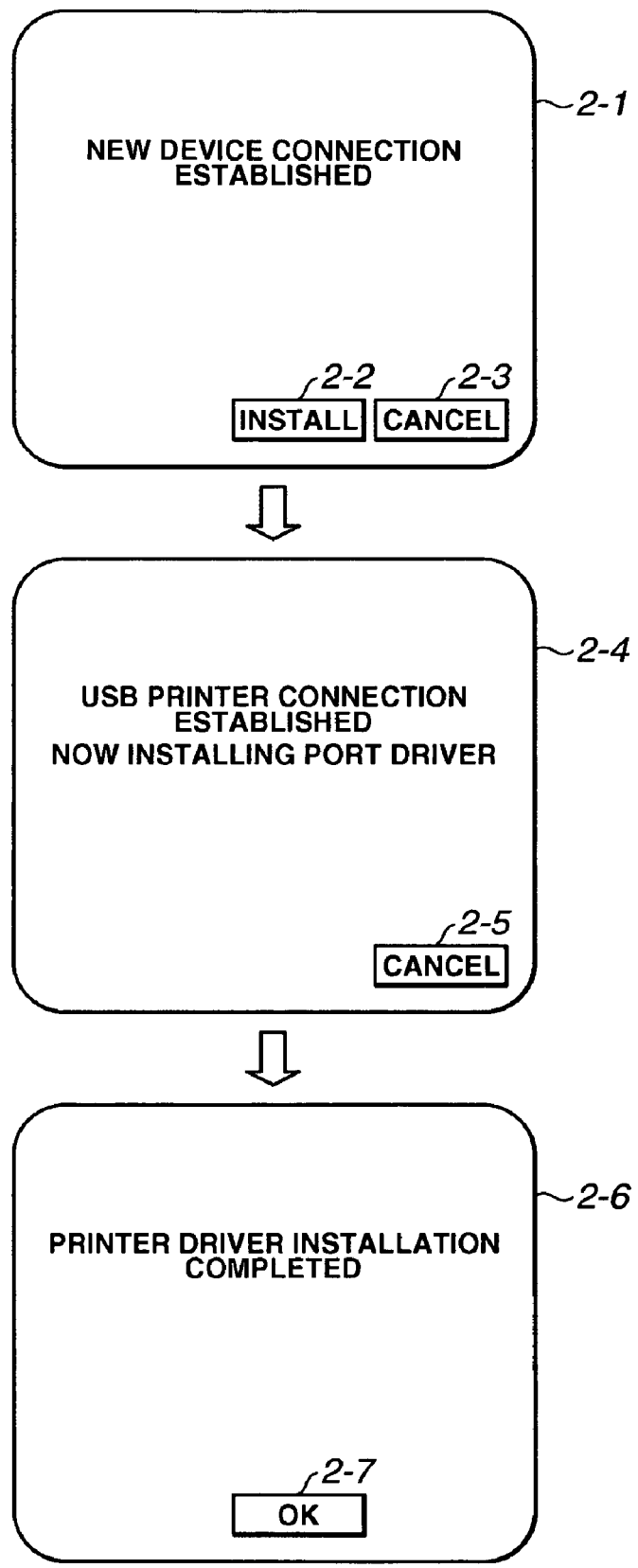
FIG. 5 shows an example of a message screen to be displayed on a CRT of the host computer shown in FIG. 2.

FIG. 5 shows an example of the message screen to be displayed on the CRT 10 of the host computer 1-1 shown in FIG. 2. The messages are automatically popped-up and displayed by the OS when a new device is connected by Plug and Ply (PnP), in this case a USB cable is connected to a USB terminal. The sequence flow and messages are applicable only to the case when Plug and Play is carried out normally. There is also an error sequence in the case of a failure of Plug and Play separately.

With reference to the flow chart shown in FIG. 6, the installation processing of a device driver is described below.

Figure 6:
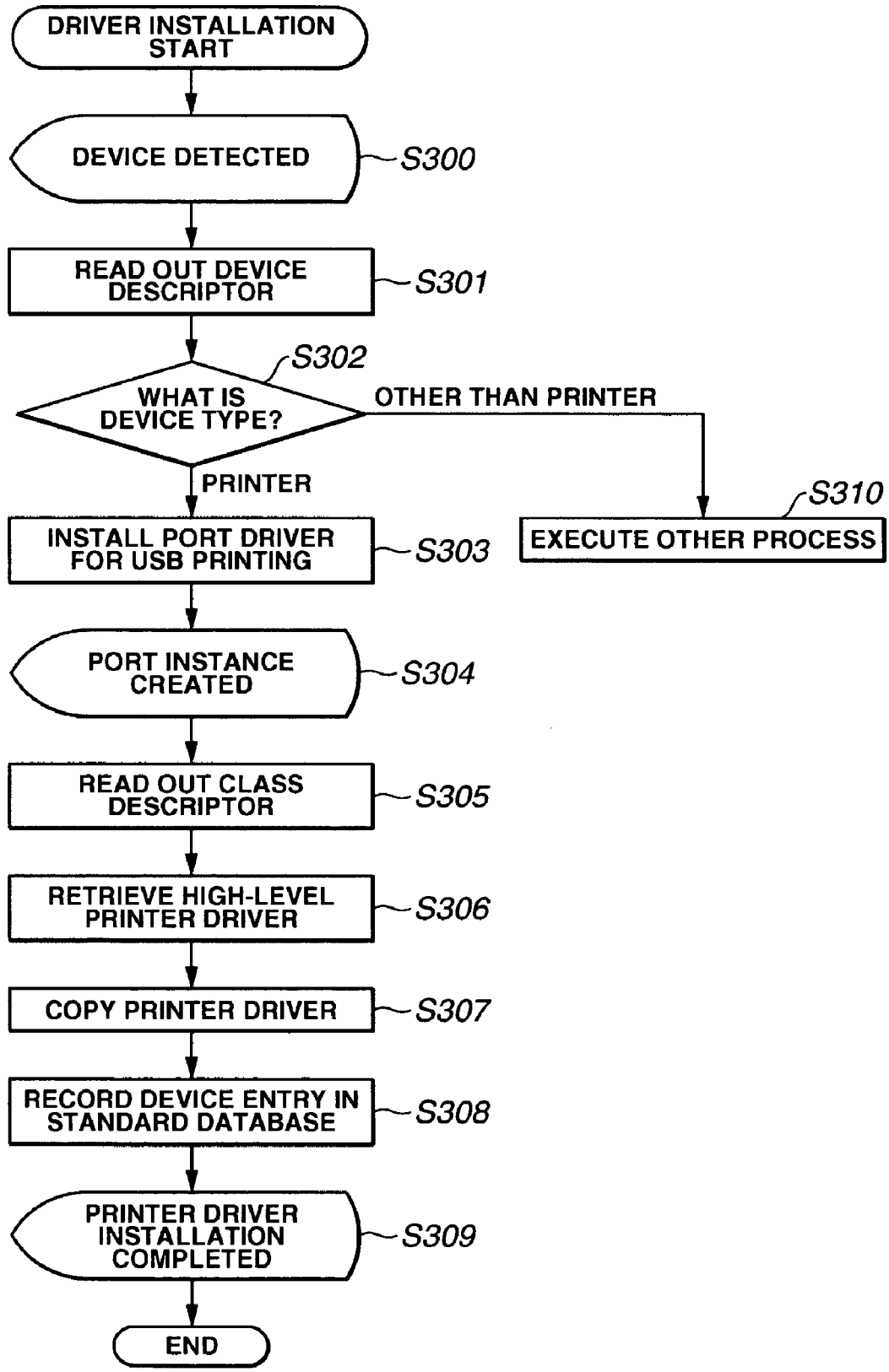
FIG. 6 is a flow chart showing an example of first data processing procedures in an information processing device according to the present invention.

FIG. 6 is a flow chart showing an example of first data processing procedures in an information processing device according to the present invention and indicates device driver installation processing procedures for Plug and Play by the OS which is loaded as a system program into the RAM 2 shown in FIG. 2. S300 to S310 show respective steps for the procedures. The procedures in the respective steps are implemented when the CPU 1 executes the system program under the control of the OS stored in the external memory 11 and the like.

First, a user connects the printer 1-2 to the host computer 1-1 using the USB interface as an interface for Plug and Play. The OS operating on the host computer 1-1 detects that some new device has been connected to the host computer 1-1 (S300) via the USB interface cable 1-5. More specifically, the CPU 1 recognizes via the USB interface 32 that the USB interface cable 1-5 has been connected to the USB connector 33.

At this moment, the message screen 2-1 shown in FIG. 5 is displayed on the CRT 10 under the control of the CPU 1. The user confirms the display of the message screen 2-1. When the user determines to carry out the installation, the user presses the displayed install button 2-2 by manipulating a pointing device (not shown).

On the other hand, when the user determines not to carry out the installation of the printer driver into the printer 1-2, he presses similarly the cancel button 2-3 by manipulating the pointing device (not shown).

Next, the OS in the PC 1-1 reads a device descriptor, which is the basic information of a USB device, from the ROM 13 of the printer 1-2 according to predetermined communication procedures designated by the USB interface 32 (S301).

The device descriptor includes the basic function information concerning the device such as device class information which indicates the device type.

Then, the OS in the PC 1-1 reads the device descriptor from the ROM 3 and analyzes it to determine whether the connected device is a device belonging to printer class, i.e., a printer (S302). If the OS determines that the connected device is a printer, it proceeds to step S303. If it determines that the connected device is a device other than a printer, it proceeds to step S310 to carry out other processing corresponding to the device.

The printer device driver is generally constituted roughly by two levels of driver. The first one is a port driver as a low-level driver that controls the protocol for data communication with the device on each interface to which a printer is connected.

The second one is a high-level printer driver that is positioned at the significant layer of the port driver and converts actual printing application data into record data and printer languages suitable for each printer.

The high-level printer driver also acquires an operation condition of the printer, i.e., status information from the printer 1-2 and transfers the status information to a printer condition display application.

In the step S302, when the OS in the PC 1-1 recognizes that the device connected to the USB connector 33 is a printer, the OS installs an appropriate port driver to make the device operational by a predetermined method (S303). At this moment, the OS in the PC 1-1 displays the message screen 2-4 as shown in FIG. 5 on the CRT 10 under the control of the CPU 1.

While this message display screen 2-4 is displayed on the CRT 10, if the user wants to cancel the installation of the port driver, the user manipulates the pointing device and presses the cancel button 2-5. Further, under the control of the port driver, a port instance is prepared as a logic connection for one to one data communication between a specific device detected on the interface and the host computer.

Next, when the USB printer is connected, after the port driver for USB printing is installed, a port instance is created as a logic communication route for communication between the printer and the host computer 1-1 (S304).

When the port driver is loaded into the RAM 2 and becomes operational through its initialization processing, the OS of the PC 1-1 acquires a class descriptor as detailed information of the printer 1-2 connected by a predetermined method (S305).

When the connected printer 1-2 is a USB printer, this class descriptor acquisition is processed by issuing the read out command (GET_CAPABILITIES) of the device ID defined by the USB printer class standard via the port driver to the printer device through the USB interface cable 1-5. The device ID that is sent back by the printer 1-2 as a response includes information specific to a printer model such as manufacturer information and model name of the printer 1-2, printer language information supported there and so forth.

Next, the OS of the PC 1-1 obtains detailed information about the connected USB printer and, on the basis of the detailed information, searches for the most suitable high-level printer driver (S306). If the corresponding high-level printer driver exists within the standard search range of the OS of the PC 1-1 (for example, exists in the external memory 11), the OS incorporates the high-level printer driver found in the standard search range.

On the other hand, if the corresponding high-level printer driver does not exist within the OS standard search range, the OS displays a prompt message which asks for the storage location of the driver on the CRT 10. In that case, the user designates a device driver included in a medium such as a flexible disk or a CD-ROM packaged at the time of purchasing the device, or downloaded from a manufacturers file server via internet, and the high-level driver is incorporated into the OS (S307).

At the time of incorporating the high-level driver, the high-level printer driver is copied to a predetermined position (directory) on the host computer 1-1 according to a predetermined procedure.

Next, items (entries) concerning the device that is now being installed are added into a database (standard database (reserved in a predetermined area of the external memory 11 shown in FIG. 2)) which is a standard component provided in the OS of the PC 1-1 (S308).

In this database, information such as control setting parameters as to device, driver and device structure, information concerning the low-level port driver related to device instance, port instance information and setting information inputted by the user and so forth are stored.

For example, in such OS's as Windows (registered trademark) 2000 and Windows (registered trademark) XP, this standard database is generally called registry and hereinafter referred to as registry. An example is shown in FIG. 7 where a registry is displayed for the user to recognize.

Figure 7:
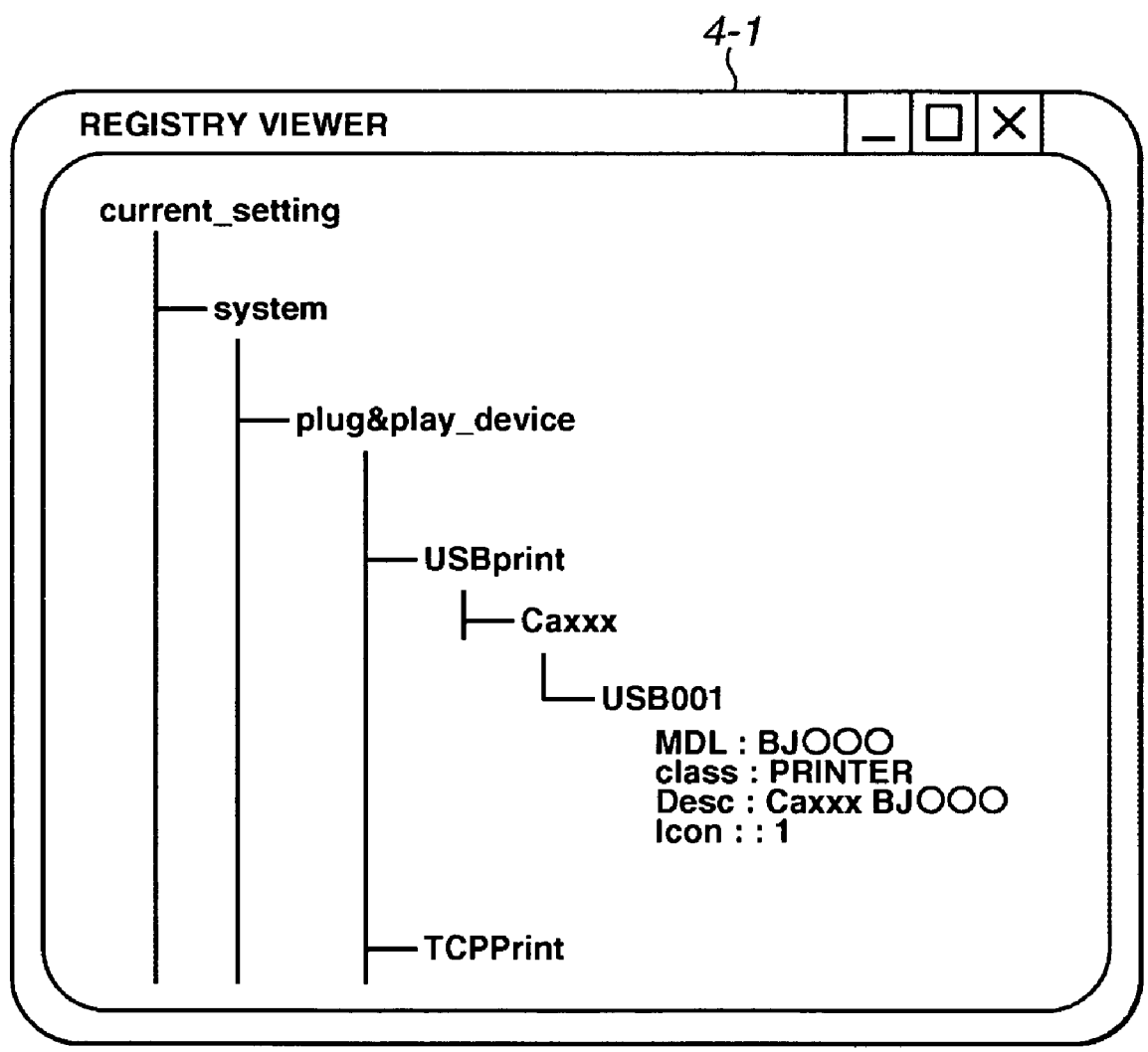
FIG. 7 is a screen illustrating a registry structured in an external memory shown in FIG. 2.

FIG. 7 is a view illustrating the structure of the registry in the external memory 11 shown in FIG. 2 and shows the condition where the registry is displayed on the CRT 10 by a registry viewer control program that the CPU 1 executes.

The view shows especially the condition where items (entries) are added to a portion under a manufacturer managed by the USB printer in a directory called PnP (plug&play_device).

This entry is created as to each device that carries out communication via the port instance created by the OS of the PC 1-1, i.e., as to each logic device. Namely, an entry is prepared at every logic connection between the OS and a device and becomes related when the corresponding port instance information is stored.

For example, if a printer having plural connection interfaces is connected to a host computer via respective interfaces, a port instance is created as to each interface. While the high-level printer driver used by a same printer is common, an entry is created on the registry as to each interface or each logic connection.

As described above, when preparation for starting the printer driver is completed, a message that the installation has been completed is displayed on the CRT 10 as shown in the message display screen 2-6 in FIG. 5 (S309). When it is confirmed that the OK button 2-7 has been pressed by manipulation of a pointing device and the like, this process is completed.

Figure 8:
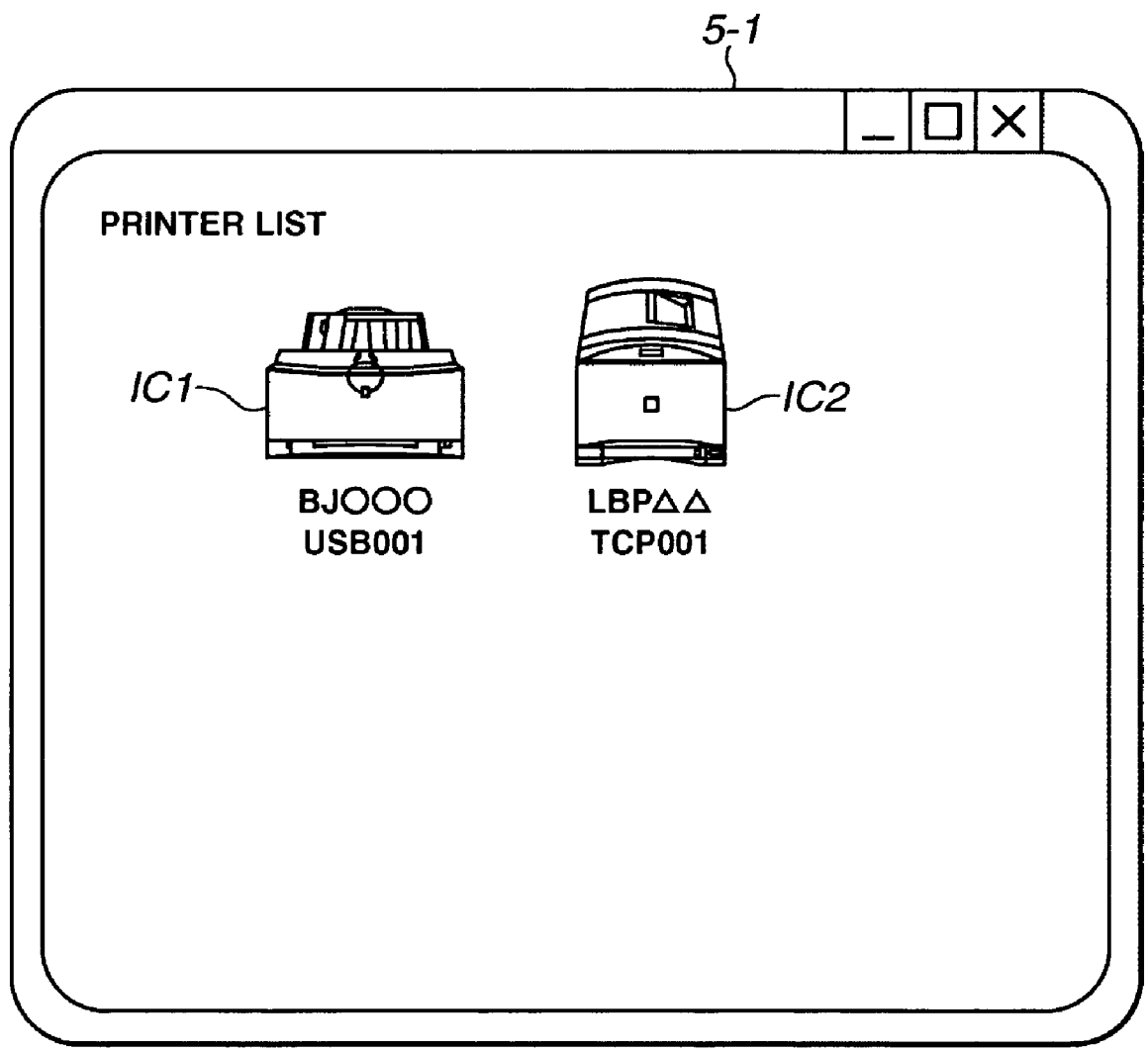
FIG. 8 shows an example of a printer list to be displayed on the CRT shown in FIG. 2.

FIG. 8 shows an example of the printer list screen that is displayed on the CRT 10 shown in FIG. 2. In the printer list screen of a typical OS having GUI, the port instance to a certain printer is displayed visually in the form of a printer icon.

As shown in FIG. 8, when plural port instances via plural interfaces are created as to a certain printer, printer icons IC1 and IC2 are displayed for respective instances. Information concerning relations of these printer icons IC1 and IC2 and port instances is described also in the entry created as to each port instance. Therefore, information that each port instance is visually represented by which printer icon, is also managed.

Up to this point, the installation processing of a general device driver in an OS conforming to the Plug and Play (PnP) has been described taking a USB printer as an example. A device driver can be installed by a different method depending on a type of OS. However, a Plug and Play device is installed in almost the same sequence as the procedure described above.

<Printer Driver Installation in the Present Embodiment>

Figure 9:
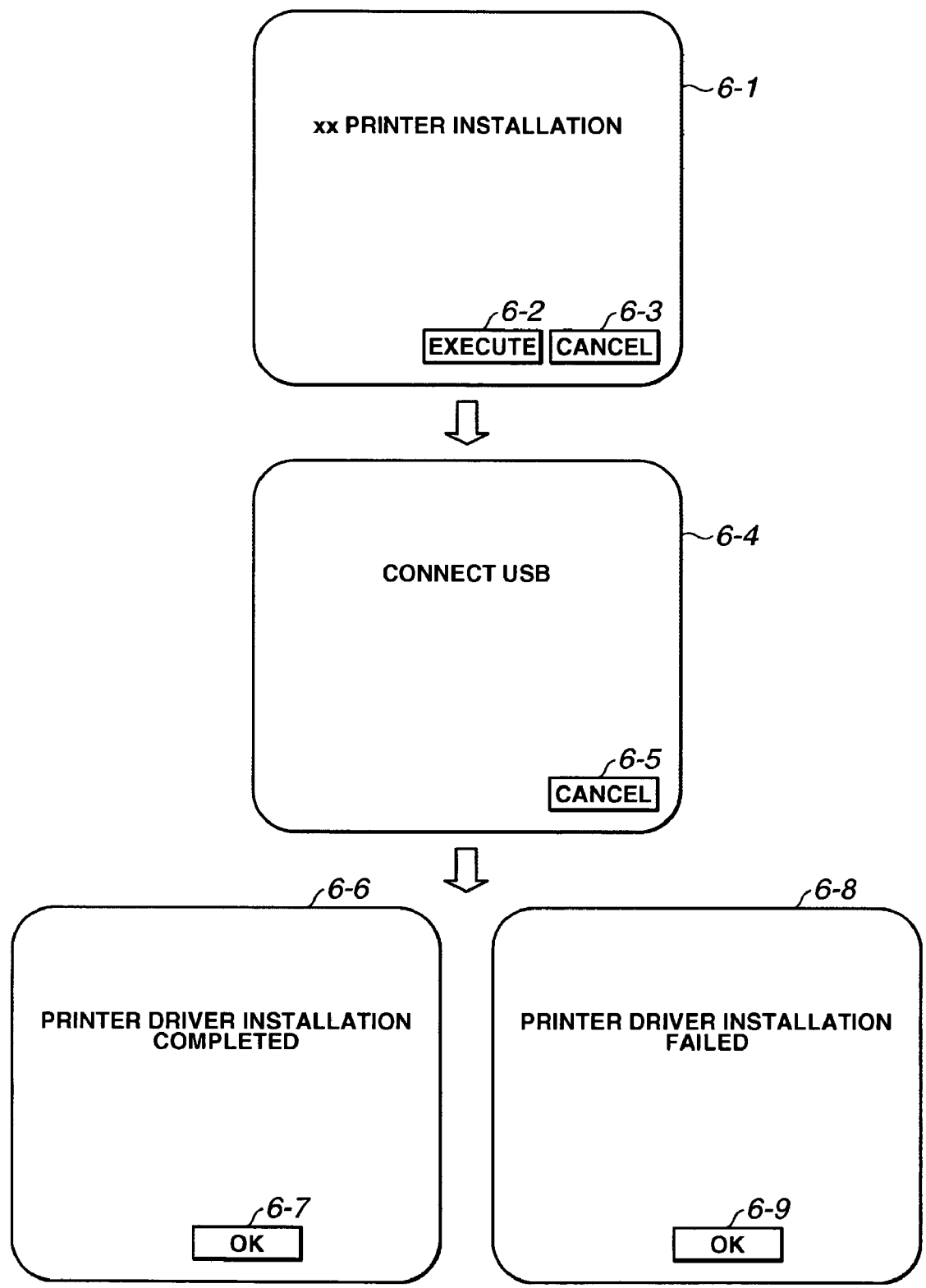
FIG. 9 is a view illustrating a screen for instructing printer driver installation to be displayed on the CRT shown in FIG. 2.

FIG. 9 is a view illustrating the screen where printer driver installation is instructed in the display on the CRT 10 shown in FIG. 2. The installation is carried out under the control of the OS of the PC 1-1 and this screen example is displayed on the CRT 10 of the PC 1-1 when the printer driver 203 is installed into the PC 1-1 to perform printing by the printer 1-2 shown in FIG. 1.

First, a message screen 6-1 is displayed under the control of the CPU 1. This message screen 6-1 appears on the CRT 10 when the user starts installation software and prompts the user to start the printer driver installation processing.

On the message screen 6-1, buttons 6-2 and 6-3 are provided for selecting "EXECUTE" and "CANCEL" respectively and either of two buttons is selected by manipulating a pointing device or the like. When the "EXECUTE" button 62 is selected with the pointing device, the printer driver installation processing gets started and the next message screen 6-4 is displayed on the CRT 10.

On the other hand, when the user selects the "CANCEL" button 6-3 by manipulating the pointing device or the like, the printer driver installation is not carried out and the process ends.

Then, in the message screen 6-4 shown in FIG. 9, a message is displayed to instruct the user to connect the USB interface cable 1-5 to the USB connector 33 of the PC 1-1 and the user connects the USB interface cable 1-5 to the USB connector 35 of the printer 1-2 according to the message instruction.

When the printer 1-2 is not yet turned on, the user turns on the printer 1-2.

The installation of the printer driver can be cancelled also in the message display screen 6-4 by manipulating the pointing device and pressing the "CANCEL" button 6-5.

When the user connects the USB interface cable 1-5 to the USB connector 33 and turns on the printer 1-2, the installation of the printer driver and the internal setting of the printer 1-2 by Plug and Play are completed.

The installation of the printer driver by Plug and Play is carried out according to the procedures described in the above-described <Printer Driver Installation>.

When the printer driver installation processing has been successfully completed as above described, the message screen 6-6 is displayed on the CRT 10 and the installation is completed. Then the "OK" button 6-7 is selected by manipulating the pointing device and the software ends the operation.

If the printer driver installation fails for some reason, the message screen 6-4 displayed on the CRT 10 changes to the message screen 6-8, and the user is informed that the installation has failed.

Then, similar to the message display screen 6-6, the "OK" button 6-9 is selected by manipulating the pointing device and the software ends the operation.

As described above, the printer driver installation using the USB interface is completed by performing the operation according to the instructions of the message display screen 6-1, the message display screen 6-4, and then the message display screen 6-6 on the CRT 10 display. Thus, it becomes possible to send print data to the printer 1-2 via the USB interface 32.

Figure 10:
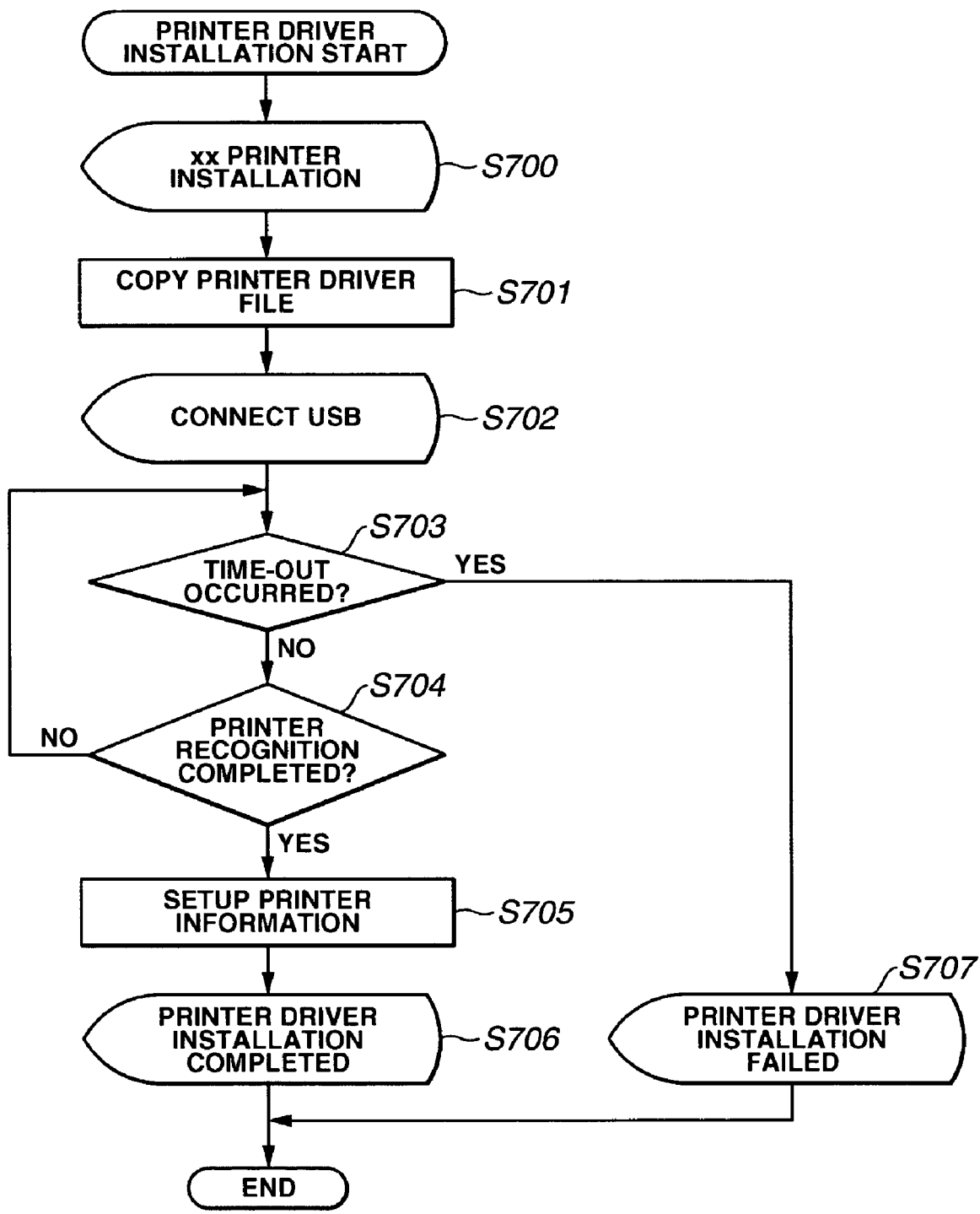
FIG. 10 is a flow chart showing an example of second data processing procedures in an information processing device according to the present embodiment.

FIG. 10 is a flow chart showing an example of second data processing procedures in an information processing device according to the present invention and shows the printer driver installation processing procedures in the OS of the PC 1-1. S700 to S707 denote respective steps of them.

First, the message screen 6-1 shown in FIG. 9 is displayed on the CRT 10 (S700). When the "EXECUTE" button 6-2 is selected in the message display screen 6-1 by manipulating the pointing device, the procedure goes on to step S701, where a printer driver execution file is copied to the system.

The location in the system where the printer driver execution file and information file are stored (for example, reserved in the external memory 11 shown in FIG. 2) is generally determined depending on the OS and according to that location the printer driver execution file is copied.

As described in the above-described <Printer Driver Installation>, the OS of the PC 1-1 determines an appropriate printer driver from the predetermined storage location of printer driver information file and carries out its entry and setting to make it available. In order to carry out this work correctly, the printer driver related files are copied on a designated location.

Then, the message screen 6-4 shown in FIG. 9 is displayed on the CRT 10 (S702). After this message screen 6-4 is displayed, it is checked whether a predetermined time has elapsed (i.e. time-out) (S703). If it is determined that the predetermined time has not elapsed, namely, time-out has not occurred, then it is checked whether printer recognition has been completed (S704).

This step confirms that the printer 1-2 has been found correctly by Plug and Play and when the printer driver installation has been completed. If confirmed, it is considered that the printer recognition has been completed. Details have been already described in the above <Printer Driver Installation>.

On the other hand, in the step S703, if it is judged that time-out has occurred, the message display screen 6-8 showing that the installation has failed is displayed on the CRT 10 (S707). When it is confirmed that the "OK" button 6-9 has been selected by manipulation of the pointing device in the message display screen 6-8 shown in FIG. 9, the printer driver installation processing via the USB interface is considered to have failed and the process ends there.

On the other hand, in the step S704, if it is determined that the recognition of the printer 1-2 has been completed, the procedure goes on to the step S705 and setting of printer information is carried out. Then, in the step S706, the message display screen 6-6 showing that the installation has been successfully completed is displayed on the CRT 20.

In the step S706, the message display screen 6-6 is displayed in place of the message display screen 2-6 shown in FIG. 5.

Then, in the message display screen 6-6, if it is confirmed that the "OK" button 6-7 has been selected by manipulation of the pointing device, the printer driver installation processing via the USB interface is completed there.

The printer 1-2 of the present embodiment has both the USB interface 34 and the card interface 31 for the wireless LAN interface. Therefore, after completing installation of the printer driver, the wireless LAN setting (wireless network installation) processing is started.

<Wireless Network Installation in the Present Embodiment>

FIG. 11 and FIG. 12 show an example of first network installation screens to be displayed on the CRT shown in FIG. 2 and corresponding to the network installation instruction screens when the access point 1-3 is used.

The present embodiment shows the screen display in the case where after completing installation of the printer driver to the USB printer shown in FIG. 9 and FIG. 10, wireless LAN installation is carried out. While in the case of installing only the USB interface, the processing is completed in the message display screen 6-6 shown in FIG. 9. In the present case, the message display screen 8-1 shown in FIG. 11 is displayed on the CRT 10 in place of the message display screen 6-6.

Namely, while in the printer having only the USB interface, installation is completed in the message display screen 6-6 shown in FIG. 9, in the printer having both the USB interface and the wireless LAN, the message display screen 8-1 shown in FIG. 11 is displayed on the CRT 10 in place of the message display screen 6-6.

If it is detected that the OK button 8-2 has been selected by manipulation of the pointing device in the message display screen 8-1, the installation is completed there and the installation of wireless LAN is not carried out.

On the other hand, if it is detected that the network installation button 8-3 has been selected by manipulation of the pointing device in the message display screen 8-1 shown in FIG. 11, the OS of the PC 1-1 starts the network installation.

In order to make explanation of the effects according to the present embodiment easier to understand, first a wireless network installation flow to which the present embodiment is not applied is described.

First, an access point is selected to establish connection to the access point 1-3.

FIG. 11 shows the message screen 8-4 displaying the access point information. The PC 1-1 sends an access point search command via the USB interface cable 1-5 to the printer 1-2 and acquires the access point information as its result via the USB interface cable 1-5 from the printer 1-2 in order to display the list of the access point 1-3 found in the printer 1-2 using the wireless LAN card 1-4 attached to the printer 1-2. The acquired information is displayed in list on the screen.

The access point list 8-5 is the list of access points found in the printer 1-2, and this example shows that three access points A, B and C have been found in the printer 1-2. Since all access points operating within a range that the wireless wave can reach are shown, it is not necessarily assumed that only the access point that the user is utilizing is displayed.

When plural access points are displayed, the user can select the access point to which the user wants to connect by moving the highlighted line in the access point list 8-5.

If the selected access point is encrypted, an encryption key for decoding the code is input to the encryption key portion 8-6. Accordingly, an encrypted access point is also available.

Encryption technologies are generally adopted in a wireless LAN for preventing wiretapping and data leakage. Wired Equivalent Privacy (WEP) is one such encryption technology in which the key is set by utilizing symmetrical algorithm where an encryption key is used for encrypting and decoding so that privacy of data can be protected from other devices.

In the case of using wireless LAN in an encrypted environment, it is necessary to set the same encryption key to the printer 1-2. In the access point list display screen 8-4, the user can return to the previous message display screen 8-1 by selecting the RETURN button 8-7.

The user can designate the access point selected in the access point list 8-5 and go to the next step by manipulating a pointing device (not shown) and selecting the NEXT button 8-8.

Further, the user can cancel the installation by manipulating a pointing device (not shown) and selecting the CANCEL button 8-9. Furthermore, in the access point list display screen 8-4 shown in FIG. 11, the user can select and designate the access point that the user is using. Accordingly, it is possible to prevent connecting to other access points by mistake.

Since the connection has been established via the access point designated in the access point list display screen 8-4, the access point of the wireless LAN of the printer 1-2 is then set and the printer 1-2 can be recognized from the access point.

In order to confirm that the printer 1-2 has been connected correctly, search for the printer 1-2 is carried out via the wireless LAN and the details thereof are described by reference to the flow chart shown in FIG. 15.

The printer list screen 8-10 displays the list of printers found via the access point 1-3. The list of printers is made when each printer that receives a printer search command sent from the wireless LAN card 1-4 of the PC 1-1 via the access point 1-3 sends back its answer thereto.

The search command is sent in a broadcast to all devices on a network. Devices that receive the search command and understand this command (in this case, a specified printer and printer adopter) send back predetermined information responding to the command to the host that has sent the command. This information includes the name, ID, address and the like of a printer. A printer to be connected can be identified on the basis of the information.

Printers which were found are listed in the printer list display 8-11 in the printer list screen 8-10. In the example, Printer 1, Printer 2, and Printer 3 are found.

Similar to the access points, a highlighted printer can be selected.

Then, the Return button 8-12 in the printer list screen 8-10 is selected by manipulation of a pointing device (not shown) and the user can return to the previous screen, i.e., the access point list display screen 8-4. After that, the Next button 8-13 is pressed and the user determines that the printer selected in the printer list display 8-11 is the connection destination.

Further, the user can cancel the installation by pressing the Cancel button 8-14. When the Next button 8-13 is selected in the printer list screen 8-10, the screen 8-15 shown in FIG. 12 is displayed on the CRT 10, which is the screen for inputting a port name.

In the port name input screen 8-15 shown in FIG. 12, a port name that the user wants to input to the port name entry 8-16 can be input by manipulation of the keyboard 9. The port name is used for distinguishing in one PC plural printers having the same function (for example, wireless LAN). "WLAN01" is set by default in this case. "WLAN" shows an identification name indicating the printer of wireless LAN and "01" shows the last number registered in the system. Numbers are allotted sequentially for distinguishing plural printers having the same function.

Generally, the port name is designated with the printer driver 203 to identify a printer to be selected for a printing job.

When the Return button 8-17 is selected in the port name input screen 8-15, the screen returns to the printer list screen 8-10, which is the previous screen. When the Next button 8-18 is selected, the port name inputted in the port name entry 8-16 is determined.

Further, the installation can be cancelled by selecting the Cancel button 8-19. When the Next button 8-18 is selected in the port name input screen 8-15, the network installation completion screen 8-20 is displayed, indicating that the network installation has been completed.

In this network installation completion screen 8-20, two options are offered and the user can select either the radio button 8-21 for creating only the printer icon of the wireless LAN or the radio button 8-22 for creating icons of both the wireless LAN and the USB.

The item indicated by "•" in two radio buttons is the one being currently selected and can be changed with a pointing device (not shown). When the OK button 8-23 is selected, a printer icon is created according to the selected radio button 8-21 or 8-22.

The printer icon is utilized so that the user can confirm or distinguish registered printers or identify a currently available printer When printing is performed by application software, a printer corresponding to the selected icon is operated.

Further, the system can be configured to send a command to acquire the name and ID of the printer USB connected via the USB interface cable 1-5 and to enable the installer to select automatically the printer, which coincides with printer information, from among printers which were found responding to the printer search command. Therefore, the printer list screen 8-10 corresponding to the display step of printer selection can be omitted.

Further, the port name input screen 8-15 can be omitted when the printer port is created automatically, thus the wireless network installation is completed.

NETWORK INSTALLATION PROCESSING EXAMPLE

Next, a network installation processing example in a printing system according to the present invention is described by reference to FIG. 13.

Figures 13, 14:
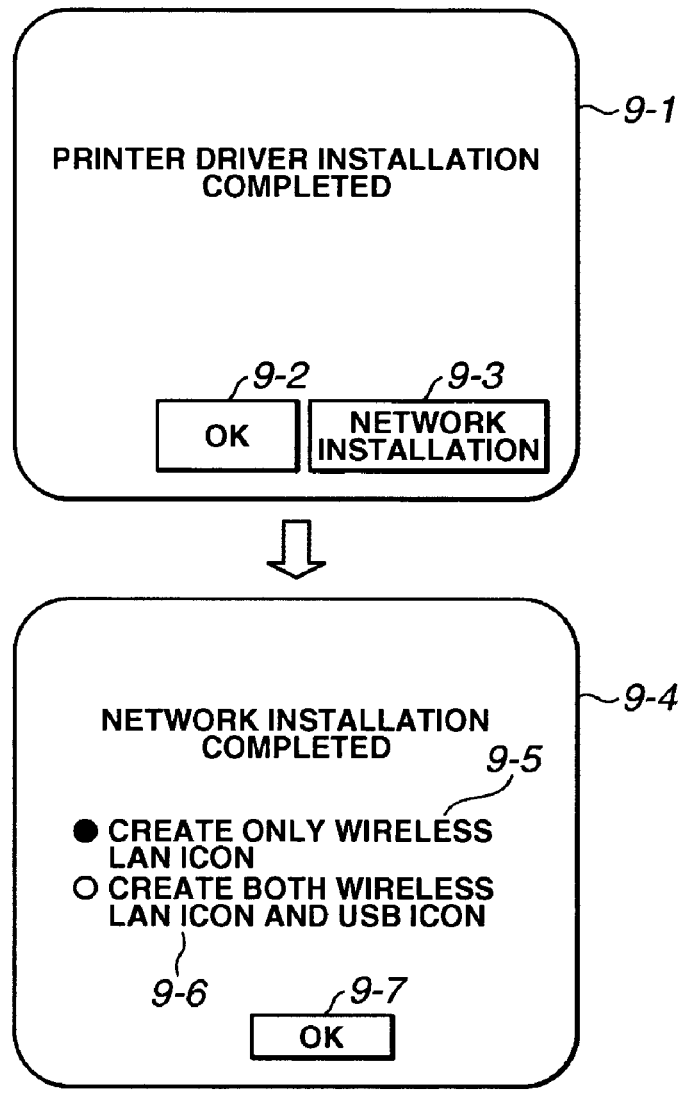
FIG. 13 is an example of a second printer driver installation screen to be displayed on the CRT shown in FIG. 2.
FIG. 14 is an example of an access point management table that a PC shown in FIG. 2 stores in its RAM.

FIG. 13 shows an example of a second printer driver installation screen to be displayed on the CRT 10 shown in FIG. 2 and corresponds to the printer driver installation instruction screen using the access point 1-3.

After completing installation of the printer driver to the PC 1-1, when the network installation button 9-3 in the printer driver installation completion screen 9-1 shown in FIG. 13 is selected by manipulation of a pointing device (not shown), the installation of network is started.

First, an access point is selected to establish connection thereto. The PC 1-1 sends an access point search command via the USB interface cable 1-5 using the wireless LAN card 1-4 connected to the printer 1-2 in order to detect access points found in the printer 1-2. The PC 1-1 acquires the access point information as its result via the USB interface cable 1-5 from the printer 1-2. Then, on the basis of the acquired information, an access point to be connected is selected.

FIG. 14 shows an example of an access point control table that the PC 1-1 shown in FIG. 2 stores in its RAM 2.

The example shown in FIG. 14 indicates the access point information found in the printer 1-2 that the PC 1-1 (network installation software, hereinafter network installer) acquired via the USB interface cable 1-5. This example shows that three access points A, B, and C have been found in the printer. All access points operating within a range that the wireless wave can reach are detected.

The characteristic structure according to the present embodiment is described below. In the present embodiment, the setting between the PC 1-1 and the access point 1-3 has been already made and communication with the access point is set up in the infrastructure mode.

In the present embodiment, it is assumed that the PC 1-1 is connected to the access point 1-3 to communicate with each other while encryption is set to disabled. Encryption of a wireless LAN is described below.

The network installer configured to work as a control module of the PC 1-1 can acquire information concerning the access point to which the PC 1-1 is currently connected by communicating with the driver of the wireless LAN card 1-4. In the present embodiment, the PC acquires through the communication information that the access point to which the PC 1-1 is connected is the access point 1-3.

The network installer automatically determines a connection access point on the basis of the information about the printer 1-2 and the PC 1-1. The network installer searches for an access point that coincides with the access point to which the PC 1-1 is currently connected from the list of access points found in the printer 1-2. If a coincident access point is found, the network installer determines that the coincident access point is a target to be connected. When connection can be established without information other than access point specification information such as encrypting setting, the network installer automatically performs connection setting.

If the printer 1-2 to which the wireless LAN card 1-4 is attached is detecting the same access point as the access point 1-3 to which the PC 1-1 currently carrying out installation work is connected, connection of the printer 1-2 is established to the same access point. As a matter of course, the PC 1-1 and the printer 1-2 to which the wireless LAN card 1-4 is attached can carry out communication via the wireless LAN.

Accordingly, if an access point that coincides with the access point to which the PC 1-1 is currently connected is found in the printer 1-2, the PC determines that the coincident access point is the target to be connected.

If entry of an encryption key (described below) by a user's operation is not necessary, designation of the access point for connection, i.e., setting of the access point, is automatically provided to the printer.

In the present embodiment, among the three access points A, B, and C (corresponding to the access point 1-3) found in the printer 1-3, the access point C coincides with the access point to which the PC 1-1 is connected, and therefore, the access point C is selected.

Further, it is recognized from detected access point information of the printer 1-2 that the access point C is operating in the condition where encryption is disabled. Accordingly, connection can be automatically established.

Therefore, the setting concerning the access point 1-3 in the wireless LAN of the printer 1-2 is carried out automatically by the installer, and the printer 1-2 becomes recognizable from the access point.

After the automatic connection to the access point 1-3 is established and in order to confirm that the printer 1-2 has been connected correctly, search for the printer 1-2 is carried out via the wireless LAN.

The present embodiment is configured, as described above, to send the command to acquire the name and ID of the printer connected via the USB interface cable 1-5 and to enable the installer to select automatically the printer which coincides with printer information from among printers which were found responding to the printer search command. Thus, the step for selecting a printer is automated.

Further, since the printer port is also automatically created when the installer succeeds in detecting the printer and creating the port, the display screen on the CRT 10 of the PC 1-1 changes from the installation completion screen 9-1 to the network completion screen 9-4.

Because of the automatic connection to the access point (i.e., the automatic detection of the printer and the automatic creation of the port name as described above), the display controls of the access point list display screen 8-4, the printer list screen 8-10, and the port name input screen 8-15 shown in FIG. 11 are omitted, and these screens are not displayed. Therefore, only the printer driver installation completion screen 9-1 corresponding to the printer driver installation completion screen 8-1 and the network installation completion screen 9-4 corresponding to the network installation completion screen 8-20 are displayed on the CRT 10 of the PC 1-1 according to the flow.

In this case, the user completes the wireless network installation only by giving two instructions with the network installation Select button 9-3 in the printer driver installation completion screen 9-1 shown in FIG. 13 and the OK button 9-7 in the network installation completion screen 9-4. Details are described by reference to the flow chart in FIG. 15.

However, when the coincident access point is encrypted, it is necessary to input an encryption key for decoding the code. Accordingly, the access point list display screen 8-4 is displayed on the CRT 10. Connection can be established to an encrypted access point by inputting the encryption key to the encryption key input portion 8-6 by manipulating the keyboard 9, for example.

Encryption technologies are generally adopted for preventing wiretapping and data leakage in a wireless LAN. As their representative, in Wired Equivalent Privacy (WEP), the key is set by utilizing symmetrical algorithm where an encryption key is used for encrypting and decoding so that privacy of data can be protected from other devices. In the case of using wireless LAN in an encrypted environment, it is necessary to set the same encryption key to the printer.

In the access point list display screen 8-4, the user can return to the previous message display screen 8-1 by selecting the Return button 8-7.

According to the present invention, information of all access points found in the printer 1-2 that the PC 1-1 (network installation software, hereinafter network installer) acquired via the USB interface cable 1-5 is displayed in the access point list 8-5. However, the access point already determined by the above-mentioned method, i.e., the access point C in the present embodiment, is in a selectable state.

After inputting the encryption key, the user can designate the access point selected in the access point list 8-5 by selecting the Next button 8-8 and going to the next step.

If there is not any coincident access point for some reason, it is necessary to display the access point list screen 8-4 on the CRT 10 and to select the access point to be connected.

Figure 15:
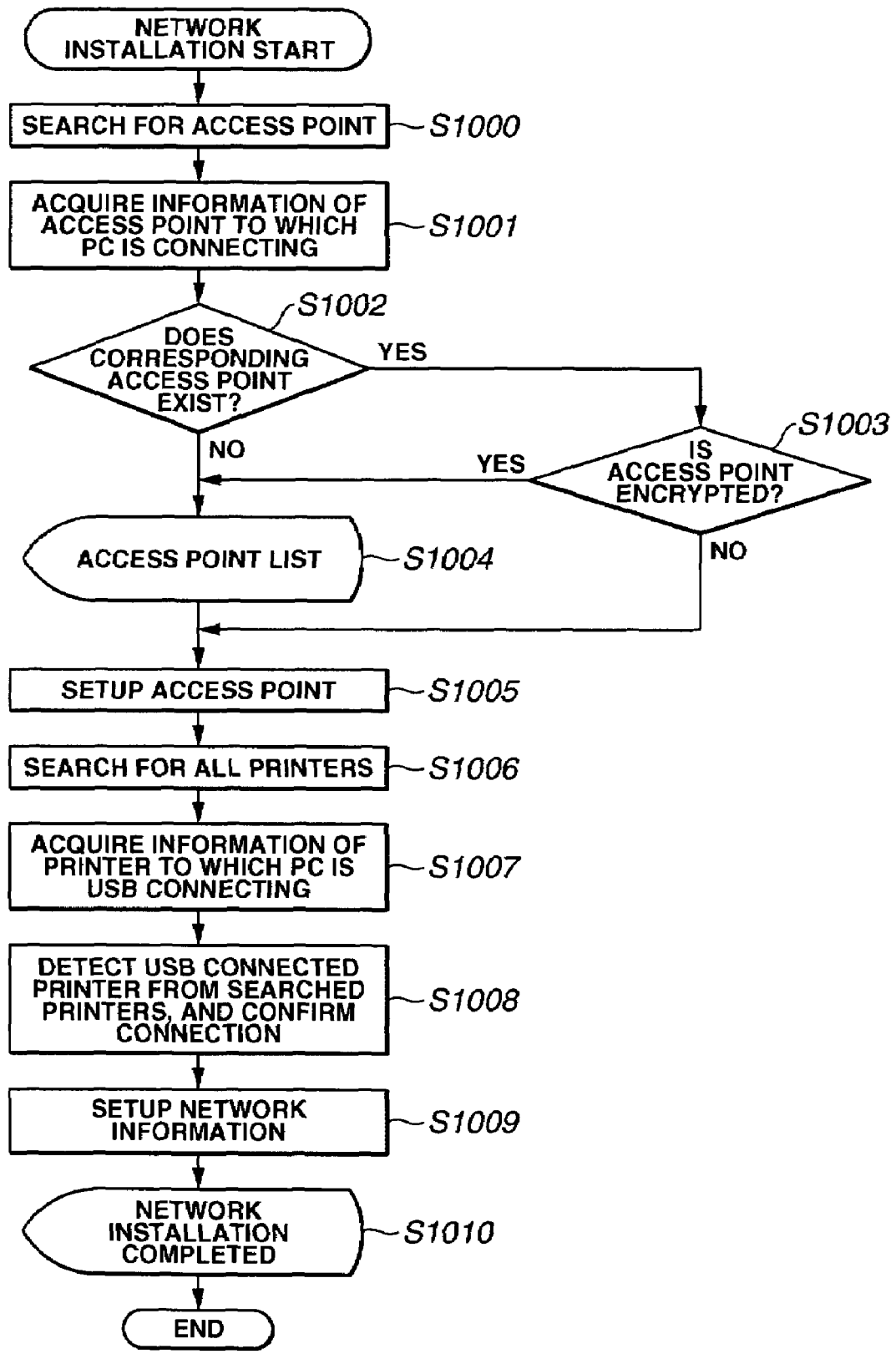
FIG. 15 is a flow chart showing an example of third data processing procedures in an information processing device according to the present invention.

FIG. 15 is a flow chart showing an example of third data processing procedures in an information processing device according to the present embodiment. FIG. 15 corresponds to the network installation processing procedures shown in FIG. 13. S1000 to S1010 are its respective steps.

FIG. 16 to FIG. 18 show command examples to be transmitted among the PC 1-1, the printer 1-4 and the access point 1-3 shown in FIG. 1.

FIG. 16 shows commands for installation that are sent via the USB cable 1-5 to the printer 1-2, and three commands, CMD1 to 3, are provided. Besides these commands, there are commands for sending printing data, commands for setting various printers and so forth, but only installation commands directly related to the present embodiment are listed there.

The first command is the command CMD1 to search for an access point and is described in the step S1000 shown in FIG. 15. The second command is the information acquisition command CMD2 and is used for acquiring from the printer 1-2 information concerning the wireless LAN which is set in the printer 1-2. The third command is the information setting command CMD3, concerning, for example, the address, mode and channel of an access point and is used for designating an access point in the step S1005 shown in FIG. 15.

FIG. 17 shows network commands used for installation and sent to a printer via wireless LAN, and two commands CMD11 and CMD12 are provided. Further, there are commands for sending printing data, commands for setting various printers and so forth, but only installation commands directly related to the present invention are listed there. Both are printer search commands, and one command is the one that all the printers receive and the other command is the one that specific printer receives. It is possible to determine using this command whether a printer on network is found and set correctly. These commands are transferred and sent back via general protocols such as TCP/IP, UDP on network.

FIG. 18 shows network adapter interface commands of a computer used in wireless network installation, and in the present embodiment, two commands CMD21 and CMD22 are provided. Besides these commands, there are commands for reading out encryption setting information, commands for setting various printers and so forth, but only installation commands directly related to the present invention are listed there. One command is CMD21 that inquires whether the network adapter attached to the computer is a wireless LAN network adapter.

When the attached adapter is a wireless LAN adapter, the other command, the connection SSID command CMD22, is issued to its adapter driver and the SSID of the access point to which the adapter is currently connected is acquired. This series of operations is described in the step S1002 shown in FIG. 15.

First, the information about the access point found in the search is sent back via the USB interface cable 1-5 to the PC 1-1 (S1000).

In the present embodiment, the PC 1-1 sends an access point search command via the USB interface cable 1-5 to the printer 1-2 in order to search for an access point. For the commands for wireless LAN installation sent via the USB interface cable 1-5, three commands CMD1, CMD2 and CMD3 are provided in the example of FIG. 16.

By sending the access point search command CMD1 to the printer 1-2, the printer 1-2 carries out the setting for access point search to the wireless LAN module using the wireless LAN module (stored in the external memory 14 and the ROM 3 shown in FIG. 2).

Then, the wireless LAM module, to which the access point search setting has been made, sends a signal of access point search. The access point (for example, access point 1-3 shown in FIG. 1) that receives this signal sends back its own access point information (ID, electric wave condition, address, channel, encryption condition and the like) to the wireless LAN module that sent the search signal. The wireless LAN module receives the information sent back from the access point, and the printer 1-2 sends back the received information to the PC 1-1. At this moment, the printer 1-2 sends back all information about found access points to the PC 1-1.

Next, in the step S1001, the PC 1-1 acquires the information concerning the access point to which the PC 1-1 is currently connected by communicating with the wireless LAN card driver of the PC 1-1.

Next, in the step S1002, the OS of the PC 1-1 checks whether there is any access point that coincides with the access point to which the PC 1-1 is currently connected on the basis of information concerning access point sent back from the printer 1-2. If the PC 1-1 determines that a coincident access point has been found, then the procedure goes on to the step S1003. In the step S1003, the OS of the PC 1-1 checks whether the target access point is operating in encrypted mode. When the OS of the PC 1-1 determines that the target access point is not operating in encrypted mode, the step S1004 is skipped and the procedure goes on to the step S1005, where the OS carries out the setting of the printer for connecting to the access point.

On the other hand, in the step S1002, when the OS of the PC 1-1 determines that there is not any coincident access point or even if there is a coincident access point, when input of the encryption key is required, the procedure goes on to the step S1004. In the step S1004, the OS displays the access point list screen 8-4 shown in FIG. 11 on the CRT 10 and instructs the user to input the encryption key or select an access point.

Then, in the step S1005, the setting for the access point connection is made on the basis of the information about the access point found in the step S1000, for example, by sending the information setting command CMD3 shown in FIG. 16 via the USB interface cable 1-5 to the printer 1-2.

The information setting command CMD3 connects the printer to a specific access point by setting information necessary for using the access point, such as the address of the access point and the encryption key.

Next, in the step S1006, search for the printer 1-2 is carried out using network commands. For the network installation commands shown in FIG. 17, two commands CMD11 and CMD12 are provided. These two commands are both search commands in which one of them is the printer search command (broadcast) that does not designate a printer, and the other is the printer search command (addressing) that designates a specific printer. In the present case, the broadcast search command is sent.

The command is sent via the wireless LAN card 1-4 to the wireless LAN, and the printer 1-2 that has received this command from the wireless LAN via the wireless LAN card 1-4 sends back the printer information (ID, name, address, model name and the like) to the PC 1-1 that sent the command.

Since the command is sent in a broadcast, all printers that understand this command may respond to this command. The PC 1-1 must select the machine type on which the PC should perform installation from the information sent back from the printer 1-2.

The PC 1-1 acquires the printer information via the USB interface cable 1-5 so as to specify the printer 1-2 connected with the USB interface cable 1-5 among the found printers (S1007).

This process is carried out by sending the information acquisition command shown in FIG. 16 via the USB interface cable 1-5 to the printer 1-2 and acquiring the printer information as its response. The printer information acquired from the printer 1-2 is compared with each other, and a printer that coincides with the printer 1-2 connected by the USB interface cable 1-5 is specified among the printers found via the wireless LAN (S1008).

Then, in the step S1009, the setting of network information is carried out and the wireless LAN becomes available. The network information is information necessary for printing, such as address and name of printer. Next, the network installation completion screen 9-4 shown in FIG. 13 is displayed (S1010) and the processing ends. A method for creating icons is described below.

In the printer list made by the OS of the PC 1-1, a printer icon showing individual port instance is created as to a printer. When plural port instances via plural interfaces are created as to one unit of printer, plural printer icons showing a same printer are displayed while they show respectively different output ports.

In the present embodiment, in the course of the installation of wireless LAN, the port instance of the USB interface cable 1-5 is created connecting the printer 1-2 and the host computer 1-1 via the USB interface cable 1-5. However, this is the port for the setup of wireless LAN and the user may not want to create (USB) port instance other than the port instance of his intended wireless LAN in some cases.

Besides, if two printer icons showing two port instances including the USB interface cable 1-5 are displayed as a result of setting up a wireless LAN, a user who wants only to set up a wireless LAN may be confused.

Therefore, the user is instructed to confirm the port instance and the printer icon created at completion of the installation in the wireless LAN setup.

In the network installation completion screen 8-20 shown in FIG. 12, the radio buttons (8-21 and 8-22) are displayed for the user to select whether to create only a printer icon of wireless LAN, i.e., only the port instance of wireless LAN as the output port instance of this printer, or to create icons of both wireless LAN and USB, i.e., a wireless LAN port and a USB port instance as a local port. Depending on the user's selection, it is determined whether the output destination is reached only via a wireless LAN or via both a wireless LAN and a USB as a result of installation.

In the case when the user creates only the port instance via a wireless LAN, in place of the printer icon showing the USB port instance created in the setup process, only a wireless LAN port instance and its printer icon are created and displayed. The screen displayed thereby to the user is shown in FIG. 19.

Figure 19:
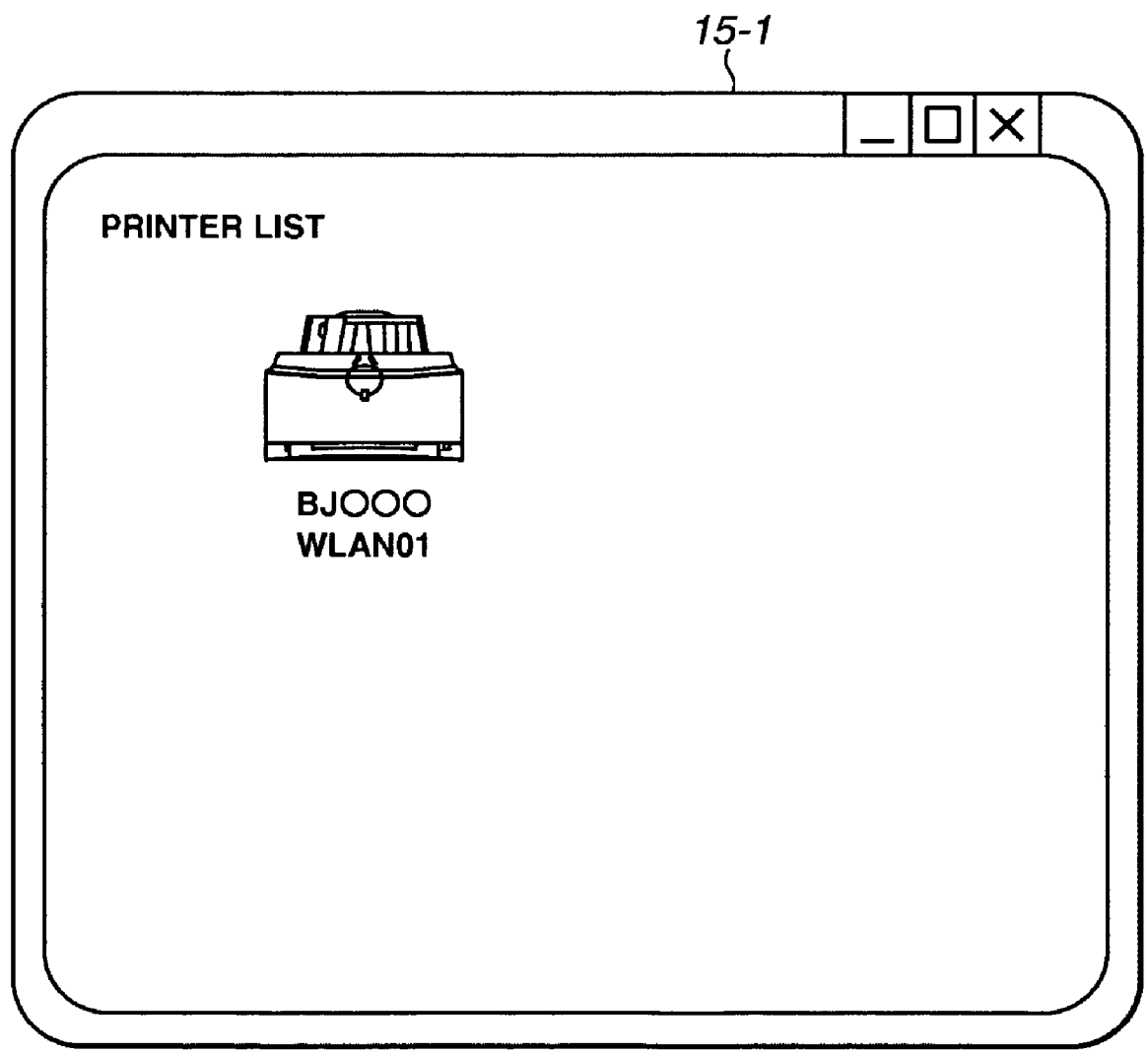
FIG. 19 is an example of a printer list icon to be displayed on a display device of the PC shown in FIG. 1.
Figure 20:
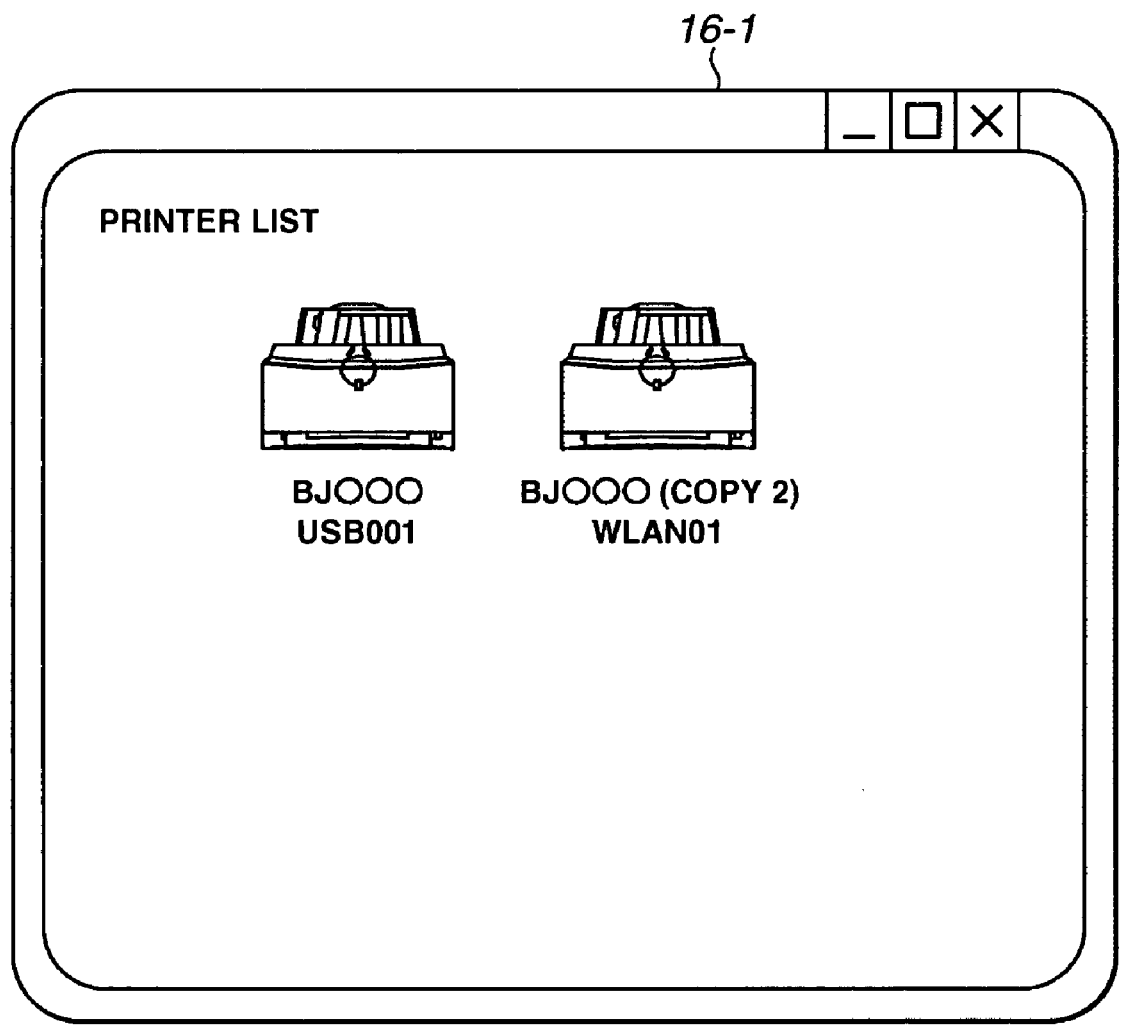
FIG. 20 is another example of printer list icons to be displayed on a display device of the PC shown in FIG. 1.

FIG. 19 and FIG. 20 show an example of a printer list icon screen to be displayed on a display device of the PC 1-1 shown in FIG. 1.

When creating the printer icon at the time of completing the installation of wireless port instance, printer icons are realized by several methods, including a method where a printer icon showing a USB port instance is deleted and then a printer icon relevant to a wireless LAN port instance is newly created, and a method where the setting of a printer icon showing a USB port instance is changed and a port instance of a wireless LAN is allotted thereto.

In any case, as described in the above-mentioned <Printer Driver Installation>, information of the relevant printer icon is described in the entry concerning wireless LAN port of the registry that the OS of the PC 1-1 has. As shown in FIG. 19, the icon information in the entry concerning USB port is deleted or information about its non-use is described. Depending on installation procedures, an entry concerning USB port, a USB port instance itself, can be deleted.

When the user selects to create port instances both via wireless LAN and via USB, the printer icon showing port instance of the USB already created in the setup process is not deleted or changed.

Accordingly, the printer list icon screen shown in FIG. 20 is displayed for the user on the CRT 10 of the PC 1-1. Further, when creating the printer icon at the time of completing the installation of the wireless port instance, a wireless LAN port instance and its printer icon are newly created.

Also in this case, as described in the above-mentioned <Printer Driver Installation>, information of the newly created printer icon is described in the entry concerning wireless LAN port of the registry that the OS of the PC 1-1 has.

When the user selects only the setup of wireless LAN port by the above method in the network installation completion screen, only the printer icon showing wireless LAN port instance is created and displayed as shown in FIG. 19. On the other hand, when both the setup of wireless LAN port and the setup of USB port are selected, two icons of both instances of wireless LAN port and USB port are created and displayed as shown in FIG. 20.

In the present embodiment, the user is instructed during the installation process in the network installation completion screen 9-4 shown in FIG. 13 to confirm the printer icon to be created at the time of completing the installation. The icon is created or deleted according to the selection of the radio buttons by the user. However, this step can be carried out at the different timing.

Conventionally, installation has been performed on a wireless LAN printer through complicated operation and setting by the user. According to the above embodiment, it is possible to carry out the setting of a wireless LAN printer automatically in accordance with a PC with which communication is established. Therefore, the setting of the printer can be carried out very easily.

In the above first embodiment, as one example, the user is instructed to select creation of a wireless LAN icon or creation of both a wireless LAN icon and a USB icon in the network installation completion screen, as shown in FIG. 12. However, the timing of giving an instruction to select creation of a wireless LAN icon or creation of both a wireless LAN icon and a USB icon is not limited to this step. The timing of giving an instruction can be set in the transition step from the printer driver installation completion screen display to the network installation completion screen display. An embodiment for this procedure is described below.

Figure 21:
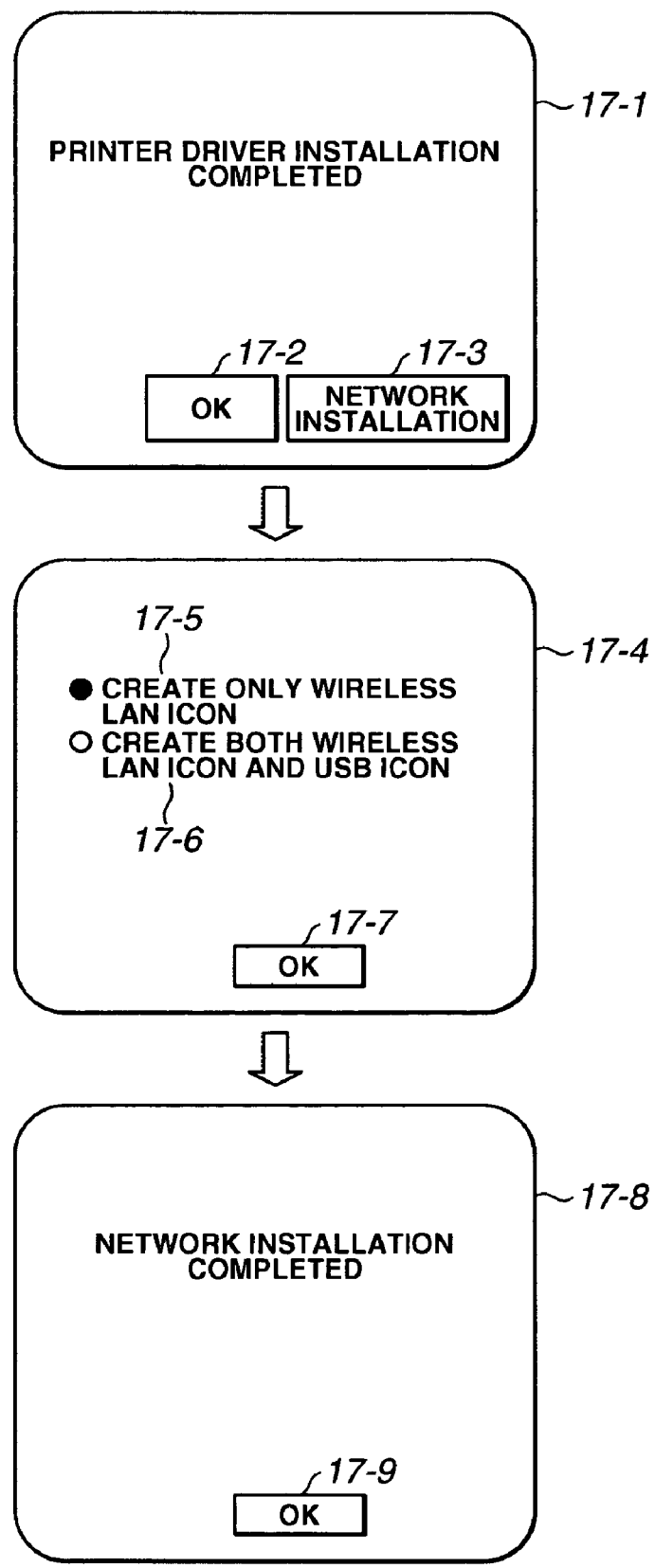
FIG. 21 is an example of a printer driver installation procedure display and a network installation procedure display in an information processing device according to the second embodiment of the present invention.

FIG. 21 shows an example of a display screen concerning a printer driver installation processing procedure and a network installation processing procedure in an information processing device according to a second embodiment of the present invention. The screen is displayed by the OS of the PC 1-1 on the CRT 10 shown in FIG. 2.

In the present embodiment, after the printer driver installation completion screen 17-1 is displayed, the icon creation selection screen 17-4 is displayed by the OS of the PC 1-1 on the CRT 10 shown in FIG. 2 when the network installation button 17-3 is selected with a pointing device. After one of the radio buttons is selected and the OK button 17-7 is selected, the network installation completion screen 17-8 is displayed by the OS of the PC 1-1 on the CRT 10 shown in FIG. 2.

Thus, in the present embodiment, the user confirms, at the start of the network setting, the printer icon to be created at the time of completing the installation. The icon showing a USB port can also be created and deleted at the moment when the USB port becomes unnecessary for the installation work, without waiting for the installation to be completed.

In the present embodiment, when there exists an access point that coincides with the access point to which the computer is currently connected and connection can be established without any information other than the access point specification information, setting of connection to the access point is automatically carried out via a USB. However, before proceeding to this step, a confirmation message can be displayed for the user.

Further, before carrying out an automatic connection, the detected access point list screen 8-4 can be displayed and the coincident access point is placed in a selectable state in the list screen and the user is instructed to confirm. This step also belongs to the present invention.

Further, in the present embodiment, when no access point is found that coincides with the access point to which the computer is currently connected, the screen 8-4 is displayed to present the list of access points detected by the printer and the user must select an access point. However, in the condition where there is not any coincident access points, the possibility that correct communication via a wireless LAN is established between the computer executing the installation, and the printer is assumed to be low. Therefore, the system can be configured to suspend the installation of wireless LAN and to communicate via a wired interface in that case.

As described above, according to the above embodiment, in a printing system including the printer 1-2 having both the USB interface and the wireless LAN interface, and the host computer that carries out wireless LAN communication at the access point 1-3, in setting up the communication between the printer 1-2 and the PC 1-1 via a wireless LAN, the printer 1-2 and the PC 1-1 are connected via the USB interface cable 1-5 and a control command is sent from the PC 1-1 via the USB interface cable 1-5. The PC 1-1 acquires the information of connectable wireless LAN access points detected by the wireless LAN card 1-4 of the printer 1-2. When there exists an access point that coincides with the access point to which the PC 1-1 is currently connected and communication can be established without acquiring no information other than specified information about the access point, the PC automatically carries out setting of connection to the access point via USB.

Third Embodiment

Hereinafter, by reference to the memory map shown in FIG. 22, a structure of a data processing program readable by a data processing system including information processing device and a printer according to the present invention is described.

Figure 22:
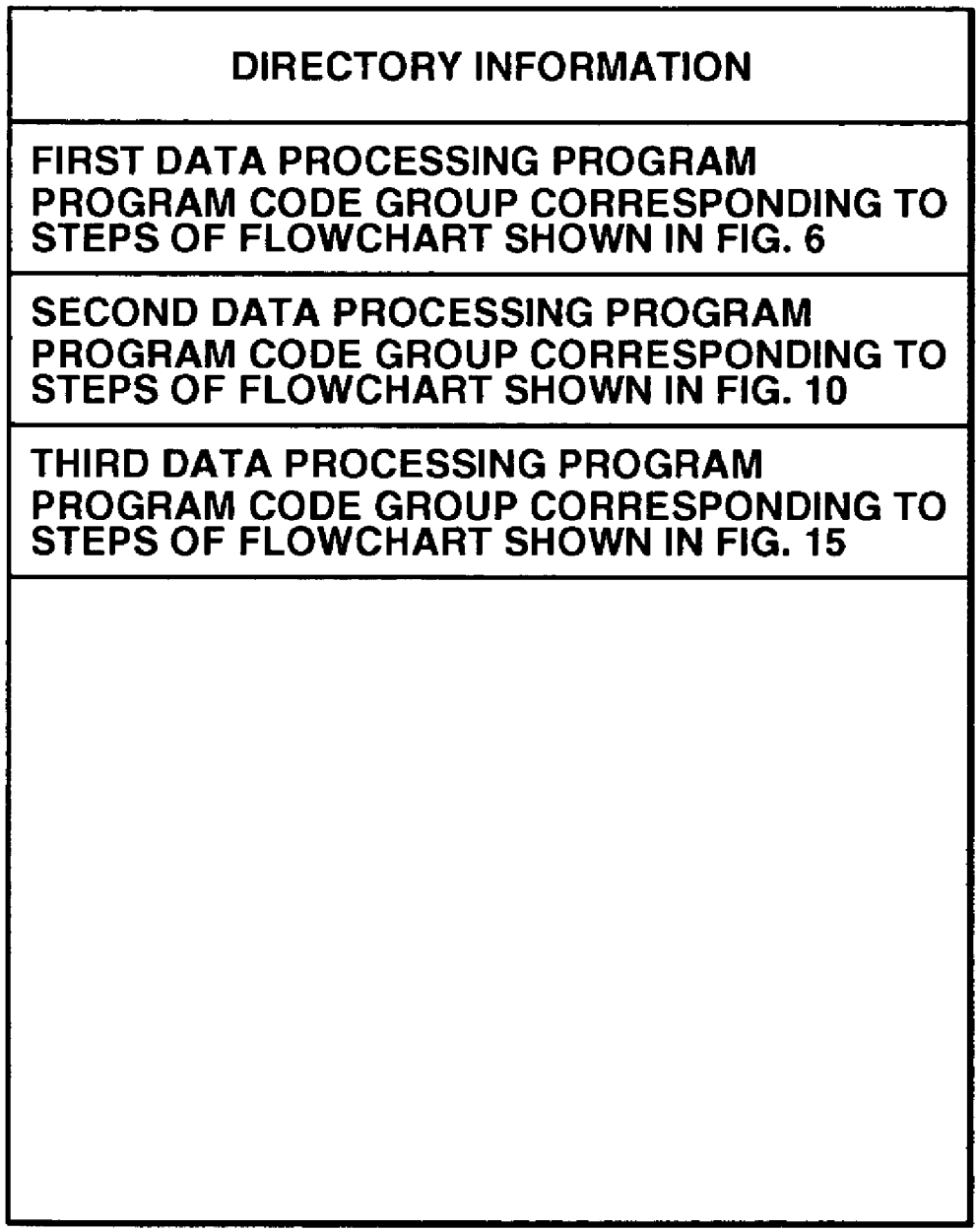
FIG. 22 is a memory map of a storage medium for storing various data processing programs readable by a data processing system including an information processing device and a printer according to the present invention.

FIG. 22 is a view illustrating a memory map of a storage medium storing various data processing programs readable by a data processing system including an information processing device and a printer according to the present invention.

Though not illustrated specifically, information for controlling programs stored in a storage medium, for example, version information, name of creator and so forth can also be stored and information depending on the OS and the like at a program read out side, for example, icons for identifying programs and so forth can be also stored.

Further, data belonging to various programs are managed in the above directory. A program for installing various programs into a computer and programs for decompressing compressed programs and so forth can be also stored.

The functions shown in FIG. 6, FIG. 10 and FIG. 15 in the present embodiment can be executed by a host computer, using programs installed from outside. Namely, the present invention can be applied also to the case where a group of information including programs is supplied, from storage media such as a CD-ROM, a flash memory or an FD, or from an external storage medium via a network, to an output device.

As described above, aspects of the present invention include a storage medium storing program codes of software for realizing the functions of the above-mentioned embodiments can be supplied to a system or a device and a computer (or a CPU or a MPU) of the system or the device reads and executes the program codes stored in the storage medium.

In this case, program codes themselves read out from the storage medium implement a novel function of the present invention, and the storage medium storing the program codes constitutes the present invention.

Accordingly, the program in any form can be employed such as object codes, program to be executed by an interpreter, a script data to be supplied to an OS and so forth so long as it functions as a program.

As a storage medium for supplying the program, for example, a flexible disk, a hard disk, an optical disk, a magneto optical disk, an MO, a CD-ROM, a CD-R, a CD-RW, a magnetic tape, a nonvolatile memory card, a ROM or a DVD can be employed.

In this case, program codes themselves read out from the storage medium implement the functions of the above-mentioned embodiments and the storage medium storing the program codes constitutes the present invention.

As the other method for supplying the program, by connecting to a homepage on internet using a browser of a client computer, the computer program of the present invention itself or compressed files including a self installation function can be downloaded into storage media such as a hard disk and so forth. Further, program codes constituting the program of the present invention can be divided into plural files, which are downloaded from different homepages. Namely, a WWW server and a ftp server and the like that enable plural users to download program files for implementing the function of the present invention on computers are also included in the claims of the present invention.

Further, the program of the present invention can be encrypted and stored into storage media such as a CD-ROM and the like and distributed to users and users who satisfy specified conditions can download key information for decoding from a homepage via internet. The users make use of the key information to execute the encrypted program and install it into computers.

Further, not only the program codes read out by a computer are executed and the functions of the above-mentioned embodiments are implemented but also subject to instructions of the program codes, an OS operating on the computer can execute part or whole of the actual processing, through which the above-mentioned functions of the embodiments are implemented. This case is also included in the scope of the present invention.

Furthermore, the program codes read out from a storage medium can be written into memories equipped in a function expansion board inserted into a computer or a function expansion unit connected to a computer, then on the basis of instructions of the program codes, a CPU or the like equipped in the function expansion board or the function expansion unit can execute part or whole of the actual processing through which the above-mentioned functions of the embodiments are implemented. This case is also included in the scope of the present invention.

The present invention is not limited to the embodiments described herein but the present invention can be embodied in various forms (including organic combinations of the embodiments), which are not excluded from the scopes of the present invention.

While various examples and embodiments of the present invention have been described above, the aspects and scopes of the present invention are not limited to the specific explanations in the present specification.

The present invention is not limited to the above-mentioned embodiments and may be embodied in several forms without departing from the sprit of essential characteristics thereof. Several examples are described below.

An information processing device capable of communicating with a printing device (for example, the printer 1-2 shown in FIG. 1) has both a wireless interface (for example, the card interface 30 and the wireless LAN card 1-4 shown in FIG. 2) for communicating with the printing device via a wireless LAN access point (for example, the access point 1-3 shown in FIG. 1), and a predetermined wired interface (for example, the USB interface cable 1-5 shown in FIG. 1) for communicating with the printing device. The information processing device includes an acquiring unit (for example, the USB interface 32 shown in FIG. 2) and an issuing unit (for example, the USB interface 32 shown in FIG. 2). The acquiring unit acquires, via the wired interface, first access point information concerning a wireless LAN access point to which the printing device is connectable. If a wireless LAN access point corresponding to the first access point information acquired by the acquiring unit coincides with a wireless LAN access point corresponding to second access point information concerning the wireless LAN access point that is information that the information processing device possesses, the issuing unit issues a network setting instruction to the printing device via the wired interface so as to enable the information processing device and the printing device to communicate with each other via the coincident wireless LAN access point.

Accordingly, in the condition where the wireless LAN settings of the access point 1-3 and the PC 1-1 are maintained, access point information of the printer 1-2 and the access point 1-3 is acquired via the USB interface cable 1-5, and the printer 1-2 is given an instruction to set up a wireless LAN connection environment while reflecting the settings of the access point 1-3 and the PC 1-1. Thus, the setup processing of the wireless LAN connection environment of the printer 1-2 can be made automatically.

The USB interface 32, after execution of installation of a driver to the printing device, may acquire, via the wired interface, the first access point information concerning a wireless LAN access point to which the printing device is connectable.

Accordingly, after completion of installation of the driver to the printing device, the connection environment with the wireless LAN access point can be subsequently set up automatically. As a result, even a user inexperienced in network settings can carry out a network connection without trouble.

A printing device (for example, the printer 1-2 shown in FIG. 1) capable of communicating with an information processing device has both a wireless interface (for example, the card interface 31 and the wireless LAN card 1-4 shown in FIG. 2) for communicating with the information processing device via a wireless LAN access point (for example, the access point 1-3 shown in FIG. 1) and a predetermined wired interface (for example, the USB interface 34 shown in FIG. 2) for communicating with the information processing device. The printing device includes a responding unit configured to, responsive to an access point information acquisition request from the information processing device via the predetermined wired interface, detect information concerning an access point accessible via the wireless interface and to transmit the information to the information processing device (the CPU 12 shown in FIG. 2 executing the communication setting control program stored in the ROM 13 and the like, carrying out access point search processing via the wireless LAN card 1-4, and transmitting the searched access point information to the information processing device via the USB interface 34). The printing device also includes a network setting unit configured to, responsive to a network setting instruction from the information processing device via the predetermined wired interface, execute network setting with the wireless LAN access point (the CPU 12 shown in FIG. 2 executing the communication setting control program stored in the ROM 13 and the like, and carrying out settings to the wireless LAN card 1-4 connected to the card interface 31).

Accordingly, in the condition where the wireless LAN settings of the access point 1-3 and the PC 1-1 are maintained, responsive to the access point information acquisition request from the PC 1-1 via the USB interface cable 1-5, access point information of the printer 1-2 and the access point 1-3 are acquired, and the printer 1-2 is given an instruction to set up a wireless LAN connection environment while reflecting the settings of the access point 1-3 and the PC 1-1. Thus, the setup processing of the wireless LAN connection environment of the printer 1-2 can be made automatically.

A printing system includes a printing device and an information processing device. The information processing device has both a wireless interface (for example, the card interfaces 30 and 31 and the wireless LAN card 1-4 shown in FIG. 2) for communicating with the printing device (for example, the printer 1-2 shown in FIG. 1) via a wireless LAN access point (for example, the access point 1-3 shown in FIG. 1) and a predetermined wired interface (the USB interfaces 32 and 34) for communicating with the printing device. The information processing device includes a requesting unit configured to request the printing device via the wired interface to acquire setting information on a wireless LAN access point (the CPU 1 shown in FIG. 2 executing the setting control program stored in the external memory 11, thereby transmitting a request command to the printer 1-2 via the USB interface 32), an acquiring unit configured to acquire, via the wired interface, first access point information that the printing device has detected from the wireless LAN access point via the wireless interface in response to the acquisition request from the requesting unit (the CPU 1 shown in FIG. 2 executing the setting control program stored in the external memory 11, thereby acquiring access point information from the printer 1-2 via the USB interface 32), and an issuing unit configured to, if a wireless LAN access point corresponding to the first access point information acquired by the acquiring unit coincides with a wireless LAN access point corresponding to second access point information concerning the wireless LAN access point that is information that the information processing device possesses, issue a network setting instruction to the printing device via the wired interface so as to enable the information processing device and the printing device to communicate with each other via the coincident wireless LAN access point (the CPU 1 shown in FIG. 2 executing the setting control program stored in the external memory 11, thereby transmitting a setting command to the printer 1-2 via the USB interface 32). The printing device includes: (1) a detecting unit configured to, responsive to the acquisition request from the requesting unit via the wired interface, detect the first access point information concerning a wireless LAN access point accessible via the wireless interface (the CPU 12 shown in FIG. 2 executing the communication setting control program stored in the ROM 13 and the like, and carrying out access point search processing via the wireless LAN card 1-4), (2) a responding unit configured to transmit, to the information processing device via the wired interface, the first access point information detected by the detecting unit (the CPU12 shown in FIG. 2 executing the communication setting control program stored in the ROM 13 and the like, and carrying out access point search processing via the wireless LAN card 1-4, and transmitting the searched access point information to the information processing device via the USB interface 34), and (3) a network setting unit configured to, responsive to a connection setting request from the information processing device via the wired interface, execute network setting of the wireless interface for wireless communications with the information processing device via the wireless LAN access point (the CPU 12 shown in FIG. 2 executing the communication setting control program stored in the ROM 13 and the like, and carrying out settings to the wireless LAN card 1-4 connected to the card interface 31).

Accordingly, in the condition where the wireless LAN settings of the access point 1-3 and the PC 1-1 are maintained, responsive to the access point information acquisition request from the PC 1-1 via the USB interface cable 1-5, access point information of the printer 1-2 and the access point 1-3 are acquired, and the printer 1-2 is give an instruction to set up a wireless LAN connection environment while reflecting the settings of the access point 1-3 and the PC 1-1. Thus, the setup processing of the wireless LAN connection environment of the printer 1-2 can be made automatically.

The information processing device further includes: (1) a list displaying unit configured to, if there is not any coincident access point, create an access point list (for example, the access point list display screen 8-4 shown in FIG. 11) based on the first access point information acquired from the printing device and to display the access point list on a display device (the CPU 1 shown in FIG. 2 executing the setting control program stored in the external memory 11, thereby displaying acquired plural access point information on the CRT 10 as a list), and (2) a selecting unit configured to select a desired access point from the access point list displayed on the display device by the list displaying unit (for example, selecting the desired access point from the access point list display screen 8-4 shown in FIG. 11 by manipulating a pointing device (not shown)). The issuing unit issues, to the printing device via the predetermined wired interface, a request for connection to the access point selected by the selecting unit.

Accordingly, when plural access points connectable to the printer 1-2 and the PC 1-1 are searched for, it is possible to determine any access points selected by a user as the connection destination.

After execution of installation of a driver to the printing device, the requesting unit requests the printing device via the wired interface to acquire setting information on a wireless LAN access point.

Accordingly, after completion of installation of the driver to the printing device, the connection environment with the wireless LAN access point can be subsequently set up automatically. As a result, even a user inexperienced in network settings can carry out a network connection without trouble.

A setting method is used in an information processing device capable of communicating with a printing device and having both a wireless interface (for example, the card interface 30 and the wireless LAN card 1-4) for communicating with the printing device via a wireless LAN access point (for example, the access point 1-3 shown in FIG. 1) and a predetermined wired interface (for example, the USB interface cable 1-5 shown in FIG. 1) for communicating with the printing device. The setting method includes: (1) an acquiring step of acquiring, via the wired interface, first access point information concerning a wireless LAN access point to which the printing device is connectable (for example, the steps S1000 and S1001 shown in FIG. 15 that the CPU 1 of the PC 1-1 can execute), and (2) an issuing step of, if a wireless LAN access point corresponding to the first access point information acquired by the acquiring step coincides with a wireless LAN access point corresponding to second access point information concerning the wireless LAN access point that is information that the information processing device possesses, issuing a network setting instruction to the printing device via the wired interface so as to enable the information processing device and the printing device to communicate with each other via the coincident wireless LAN access point (for example, the step S1005 shown in FIG. 15 that the CPU 1 of the PC 1-1 can execute).

Accordingly, in the condition where the wireless LAN settings of the access point 1-3 and the PC 1-1 are maintained, access point information of the printer 1-2 and the access point 1-3 are acquired via the USB interface cable 1-5, and the printer 1-2 is given an instruction to set up a wireless LAN connection environment while reflecting the settings of the access point 1-3 and the PC 1-1. Thus, the setup processing of the wireless LAN connection environment of the printer 1-2 can be made automatically.

Further, in the acquiring step, after execution of installation of a driver to the printing device (the steps S1000 to S1010 shown in FIG. 15 to be executed in succession to the step S706 shown in FIG. 10 that the CPU 1 of the PC 1-1 can execute), the first access point information concerning a wireless LAN access point to which the printing device is connected is acquired via the wired interface.

Accordingly, after completion of installation of the driver to the printing device, the connection environment with the wireless LAN access point can be subsequently set up automatically. As a result, even a user inexperienced in network settings can carry out a network connection without trouble.

A setting method is used in a printing system including a printing device and an information processing device. The information processing device has both a wireless interface for communicating with the printing device via a wireless LAN access point and a predetermined wired interface for communicating with the printing device. The setting method in the information processing device includes: (1) a requesting step of requesting the printing device via the wired interface to acquire setting information on a wireless LAN access point (the step S1000 shown in FIG. 15 that the CPU 1 of the PC 1-1 shown in FIG. 1 can execute), (2) an acquiring step of acquiring, via the wired interface, first access point information that the printing device has detected from the wireless LAN access point via the wireless interface in response to the acquisition request from the requesting step (the step S1001 shown in FIG. 15 that the CPU 1 of the PC 1-1 shown in FIG. 1 can execute), and (3) an issuing step of, if a wireless LAN access point corresponding to the first access point information acquired by the acquiring step coincides with a wireless LAN access point corresponding to second access point information concerning the wireless LAN access point that is information that the information processing device possesses, issuing a network setting instructions to the printing device via the wired interface so as to enable the information processing device and the printing device to communicate with each other via the coincident wireless LAN access point (the step S1005 shown in FIG. 15 that the CPU 1 of the PC 1-1 shown in FIG. 1 can execute). The setting method in the printing device includes: (1) a detecting step of, responsive to the acquisition request from the requesting step via the wired interface, detecting the first access point information concerning a wireless LAN access point accessible via the wireless interface (a processing step (not shown) to be executed by the CPU 12 of the printer 1-2 along with the step S1000 shown in FIG. 15 that the CPU 1 of the PC 1-1 shown in FIG. 1 can execute), (2) a responding step of transmitting, to the information processing device via the wired interface, the first access point information detected by the detecting step (a processing step (not shown) to be executed by the CPU 12 of the printer 1-2 along with the step S1001 shown in FIG. 15 that the CPU 1 of the PC 1-1 shown in FIG. 1 can execute), and (3) a network setting step of, responsive to a connection setting request from the information processing device via the wired interface, executing a network setting of the wireless interface for wireless communications with the information processing device via the wireless LAN access point (a processing step (not shown) to be executed by the CPU 12 of the printer 1-2 along with the step S1005 shown in FIG. 15 that the CPU 1 of the PC 1-1 shown in FIG. 1 can execute).

Accordingly, in the condition where the wireless LAN settings of the access point 1-3 and the PC 1-1 are maintained, responsive to the access point information acquisition request from the PC 1-1 via the USB interface cable 1-5, access point information of the printer 1-2 and the access point 1-3 are acquired, and the printer 1-2 is given an instruction to set up a wireless LAN connection environment while reflecting the settings of the access point 1-3 and the PC 1-1. Thus, the setup processing of the wireless LAN connection environment of the printer 1-2 can be made automatically.

The setting method in the information processing device further includes: (1) a list displaying step of, if there is not any coincident access point, creating an access point list based on the first access point information acquired from the printing device and displaying the access point list on a display device (the step S1004 shown in FIG. 15 that the CPU 1 of the CP 1-1 shown in FIG. 1 can execute), and (2) a selecting step of selecting a desired access point from the access point list displayed on the display device by the list displaying step (a step (not shown) that can be executed between the step S1004 and the step S1005 shown in FIG. 15 that the CPU 1 of the CP 1-1 shown in FIG. 1 can execute). The issuing step issues, to the printing device via the predetermined wired interface, a request for connection to the access point selected by the selecting step.

Accordingly, when plural access points connectable to the printer 1-2 and the PC 1-1 are searched for, it is possible to determine any access points selected by a user as the connection destination.

After execution of installation of a driver to the printing device, the requesting step requests the printing device via the wired interface to acquire setting information on a wireless LAN access point.

Accordingly, after completion of installation of the driver to the printing device, the connection environment with the wireless LAN access point can be subsequently set up automatically. As a result, even a user inexperienced in network settings can carry out a network connection without trouble.

Further, a computer-readable storage medium having a program stored thereon for executing the above setting method is provided.

While the present invention has been described with reference to exemplary embodiments, it is to be understood that the invention is not limited to the disclosed embodiments. The scope of the following claims is to be accorded the broadest interpretation so as to encompass all modifications, equivalent structures and functions.

This application claims priority from Japanese Patent Application No. 2004-193950 filed Jun. 30, 2004, which is hereby incorporated by reference herein in its entirety.

What is claimed is:

1. An information processing device connected to a printer via a wired interface, the information processing device comprising:

a first sending unit configured to send a search command for searching an access point to the printer via the wired interface;

an acquiring unit configured to acquire information about an access point to which the information processing device is connected;

a determining unit configured to determine whether there is an access point which coincides with an access point to which the information processing device is connected and to which the printer is connectable according to access point information received from the printer via the wired interface and searched by the printer according to the search command and the information about the access point acquired by the acquiring unit;

a second sending unit configured to send a setting command for connecting the printer and the access point to the printer via a wired interface according to the access point information received from the printer and searched by the printer according to the search command, when the determining unit determines that there is an access point; and a setting unit configured to specify a printer that coincides with the printer connected with the information processing device via the wired interface out of printers searched by a wireless network and to set network information for making the specified printer available by the wireless network.

2. An information processing device according to claim 1, wherein, when the determining unit determines that there is an access point, a user selects an access point and the sending unit sends a setting command for connecting the printer and the selected access point to the printer via a wired interface.

3. An information processing device according to claim 1, wherein, when the determining unit determines that there is an access point and an encryption key is to be input, a user inputs the encryption key and the sending unit sends a setting command for connecting the printer and the access point to the printer via a wired interface.

4. An information processing device according to claim 1, further comprising a selecting unit configured to select either way to generate a printer icon of the wireless network or to generate printer icons of the wireless network and of the wired interface.

5. An information processing device connected to a printer via a wired interface, the information processing device comprising:

a first sending unit configured to send a search command for searching an access point to the printer via the wired interface;

an acquiring unit configured to acquire information about an access point to which the information processing device is connected;

a determining unit configured to determine whether there is an access point which coincides with an access point to which the information processing device is connected and to which the printer is connectable according to access point information received from the printer via the wired interface and searched by the printer according to the search command and the information about the access point acquired by the acquiring unit; and a second sending unit configured to send a setting command for connecting the printer and the access point to the printer via a wired interface according to the access point information received from the printer and searched by the printer according to the search command, when the determining unit determines that there is an access point.

* * * * *